US009037961B1

(12) United States Patent
Mansell

(10) Patent No.: US 9,037,961 B1
(45) Date of Patent: May 19, 2015

(54) SYSTEM AND METHOD FOR STORING A SERIES OF CALCULATIONS AS A FUNCTION FOR IMPLEMENTATION IN A SPREADSHEET APPLICATION

(75) Inventor: Howard Christopher Mansell, Brooklyn, NY (US)

(73) Assignee: Credit Suisse Securities (USA) LLC, New York, NY (US)

( * ) Notice: Subject to any disclaimer, the term of this patent is extended or adjusted under 35 U.S.C. 154(b) by 801 days.

(21) Appl. No.: 13/098,826

(22) Filed: May 2, 2011

Related U.S. Application Data

(63) Continuation of application No. 11/729,095, filed on Mar. 28, 2007, now abandoned.

(60) Provisional application No. 60/845,342, filed on Sep. 18, 2006.

(51) Int. Cl.
G06F 17/00 (2006.01)
G06F 17/24 (2006.01)

(52) U.S. Cl.
CPC .................................. G06F 17/246 (2013.01)

(58) Field of Classification Search
CPC ................................................... G06F 17/246
USPC ........................................................ 715/212
See application file for complete search history.

(56) References Cited

U.S. PATENT DOCUMENTS 5,305,221 A * 4/1994 Atherton ........................ 700/96
5,471,575 A * 11/1995 Giansante ..................... 715/202
5,799,295 A * 8/1998 Nagai .............................. 706/46
5,926,822 A * 7/1999 Garman ........................ 715/201
6,574,788 B1 6/2003 Levine et al.
6,742,162 B2 * 5/2004 Bennett ......................... 715/217
7,266,763 B2 9/2007 Peyton-Jones et al.
7,454,471 B2 * 11/2008 Sorge et al. ................... 709/206
7,469,377 B2 12/2008 Winser
7,536,401 B2 * 5/2009 Bitonti et al. ........................ 1/1
7,610,294 B2 * 10/2009 Borgsmidt ............................ 1/1
7,624,372 B1 * 11/2009 Stewart ......................... 717/113
7,640,490 B2 12/2009 Boon
7,792,847 B2 * 9/2010 Dickerman et al. .......... 707/756
8,429,625 B2 * 4/2013 Liege ............................ 717/139

(Continued)

OTHER PUBLICATIONS

Witkowski et al., Spreadsheets in RDBMS for OLAP, ACM 2003, pp. 52-63.*

(Continued)

Primary Examiner — Cong-Lac Huynh
(74) Attorney, Agent, or Firm — King & Spalding

(57) ABSTRACT

The dependency graph spreadsheet system allows for the capture of a sequence of calculations or formulas as a function. The function is stored as a function definition in a spreadsheet application. The function definition provides the ability to call or select a name or code associated with the function or function definition in the spreadsheet application by placing the name in a cell of the spreadsheet application. If the form of the calculation needs to be verified or modified, the function is reviewed and/or modified in the function definition worksheet, eliminating the need to seek out each invocation of the function in the spreadsheet application. The dependency graph spreadsheet system also provides the ability to invoke a higher order function that uses a defined function as an input and generates an output from the higher order function on a range of data inputs for the defined function in the spreadsheet.

23 Claims, 18 Drawing Sheets

(56) References Cited

U.S. PATENT DOCUMENTS

| | | |
|---|---|---|
| 2002/0083065 A1* | 6/2002 | Sasaki et al. .................. 707/100 |
| 2003/0009649 A1 | 1/2003 | Martin et al. |
| 2003/0093351 A1* | 5/2003 | Sarabanchong ................ 705/36 |
| 2004/0103366 A1 | 5/2004 | Peyton-Jones et al. |
| 2005/0015714 A1 | 1/2005 | Cahill et al. |
| 2005/0222916 A1 | 10/2005 | Ohbitsu |
| 2005/0257132 A1* | 11/2005 | Karby ........................... 715/503 |
| 2006/0080369 A1 | 4/2006 | Razdow et al. |
| 2006/0112388 A1* | 5/2006 | Taniguchi et al. ............ 718/100 |
| 2006/0161844 A1* | 7/2006 | Simkhay et al. .............. 715/538 |
| 2006/0282818 A1 | 12/2006 | DeSpain |
| 2007/0044080 A1 | 2/2007 | Vick et al. |
| 2007/0080964 A1* | 4/2007 | Kainz et al. .................. 345/440 |
| 2007/0233811 A1 | 10/2007 | Rochelle et al. |
| 2009/0158139 A1 | 6/2009 | Morris et al. |
| 2010/0199269 A1* | 8/2010 | Hattori et al. ................. 717/146 |
| 2014/0101009 A1* | 4/2014 | Baer et al. ....................... 705/31 |

OTHER PUBLICATIONS

Asuncion, In Situ Data Provenance Capture in Spreadsheets, IEEE 2011, pp. 1-8.*
Allard, Functional and Structural Recursion in Spreadsheet Languages, Google 2002, pp. 1-65.*
Lamping, An algorithm for Optimal Lambda Calculus Reduction, ACM 1990, pp. 16-30.
Perlin, Call-Graph Caching: Transforming Programs into Networks, Google 1989, pp. 122-128.
Jansen et al., Efficient Interpretation by Transforming Data Types and Patterns to Functions, Google 2006, pp. 1-18.
Peyton-Jones et al., A User-Centred Approach to Functions in Excel, ACM 2003, pp. 165-176.

* cited by examiner

Function Definition Worksheet

Function Name: My func
Summary: _____
Description: _____

|   | A | B | C | D | E |
|---|---|---|---|---|---|
| 1 | Name | Type | Input | Summary | Description |
| 2 | Num | Long | 6 | | |
| 3 | Unit | String | M | | |
| 4 | | | | | |
| 5 | Output | Type | Value | | |
| 6 | Result | Double | =A10 | | |
| 7 | | | | | |
| 8 | Calculation | | | | |
| 9 | =UPPER(C2&C3) | | | | |
| 10 | =date_alpha2tenor(C9) | | | | |

Meta notation: *italic* indicates a non-terminal, typewriter script indicates a terminal, `::=` gives a grammar rule, `{...}` is used for grouping, infix `|` indicates alternatives, postfix `?` indicates that the preceding item is optional, postfix `*` indicates that the preceding item can be repeated an arbitrary number of times.

*lamExpr* ::= *lamArgs* -> *expr*
*lamArgs* ::= *args* { : *retType* }?
*args* ::= *arg* | ( *arg* { , *arg* }* )
*arg* ::= *var* { : *type* }?
*retType* ::= *type* | ( *type* { , *type* }* )
*expr* ::= *letExpr* | (*lamExpr*) | *tupleExpr* | *excelExpr*
*excelExpr* ::= ... as defined by Excel
*tupleExpr* ::= ( *expr* { , *expr* }* )
*letExpr* ::= let *binding* { ; *binding* }* in *expr*
*binding* ::= *varBinding* | *funcBinding*
*varBinding* ::= *var* = *expr*
*funcBinding* ::= *var* *lamArgs* = *expr*
*type* ::= Long | Double | Date | String | Object | Boolean | Variant | Long_Array | Double_Array | Date_Array | String_Array | Object_Array | Boolean_Array | Variant_Array
*var* ::= sequence of letters, digits, and _

The *tupleExpr* is used to specify multiple return values from a function. A lambda expression cannot contain references to cells, ranges, or variables defined outside the lambda expression. A further extension to the worksheet's syntax is that the notation to build arrays, i.e., {x1, x2, ... }, works with arbitrary values and not just literals.

The term *funcBinding* is shorthand for binding a lambda expression. For example, the binding in expression (1) below is equivalent to expression (2).

*var lamArgs = expr*           (1)
    *var = (lamArgs -> expr)*      (2)

Using a *lamExpr*, (vs->exp), inside a lambda expression is equivalent to using func_lambda("n", "vs->exp"). If the expression has free variables the translation is a little more complicated. The free variables are added to the lambda expression passed to func_lambda and func_bind is used to bind them. For example, the following is a valid lambda expression:
  (xs:Object) : Object ->
  let a = 5;
     adda(x) = x+a
  in func_map("n", adda, xs)
The exemplary lambda expression translates to the following:
  (xs:Object) : Object ->
  let a = 5;
     adda = func_bind("n", func_lambda("n", "(a, x) -> x+a"), a)
  in func_map("n", adda, xs).

Figure 16A

Functions defined using *funcBinding* can be used with regular function application syntax within the lambda expression. This translates to a call to func_value. The following is an example:
```
(x:Double) : Double ->
  let sqr(y) = y * y
  in sqrt(sqr(x) + sqr(x+1))
```
And it translates to the following
```
(x:Double) : Double ->
  let sqr = func_lambda("n", "y -> y * y")
  in sqrt(func_value("n", sqr, x) +
       func_value("n", sqr, x+1)).
```

The following is an example of a basic mapping function in the form of a lambda expression, in which the worksheet expression returns a range with all values incremented by 1:
=func_map("n","(x)->x+1",C7:C11).

The following is an example of a function, in the form of a lambda expression, that computes the harmonic mean of its argument range:
(r:Object):Double -> range_depth(r) / func_fold("n", ((s:Double, x:Double) -> s+1/x), 0, r)

A more verbose, and perhaps readable, version of the function above would be as follows:
```
(r:Object):Double ->
  let len = range_depth(r);
      total = func_fold("n", ((s:Double, x:Double) -> s+1/x), 0, r);
  in len / total.
```

The following is an example of a function, in the form of a lambda expression that returns a range where each element is divided by the harmonic mean of the whole range:
```
(r:Object):Double ->
  let hm = range_depth(r) / func_fold("n", ((s:Double, x:Double) -> s+1/x), 0, r);
  in func_map("n", ((x)->x/hm), r).
```

Figure 16B

The following is a more complicated version of a lambda expression. This example below presents one method for operating on pairs of rows at a time. It is done in the example below by mapping not over the rows themselves, but instead over the indicies of the range.

```
(rows:Object) :Object ->
let
    f(j:Long):Object =
        let t0 = range_value(rows, j, 1);
            t1 = range_value(rows, j+1, 1);
            d = sqrt(t1-t0);
            x0s = range_subset(rows, j, 2, 1);
            x1s = range_subset(rows, j+1, 2, 1);
            x01s = range_merge(x0s, x1s);
            g(x0:Double, x1:Double) = (ln(x1) - ln(x0)) / d
        in range_transpose(func_map("n", g, range_transpose(x01s)))
in func_map("n", f, mtrx_iota(range_depth(rows)-1, 1, 1))
```

Immediately below is the same example as above in a more verbose form:
```
(rows:Object):Object ->
// Generic definitions:
let
    // Less verbose func_map
    map(f,xs) = func_map("n", f, xs);
    // Transposed map; maps over columns
    tmap(f,xs) = range_transpose(map(f, range_transpose(xs)));
    // Transposed map over two arguments
    tmap2(f, xs, ys) = tmap(f, range_merge(xs, ys));
    // Less verbose func_fold
    fold(f,z,xs) = func_fold("n", f, z, xs);
    // Fold over non-empty array, no zero element
    fold1(f,rs) = fold(f, range_value(rs, 1, 1), range_subset(rs, 2, 1));
    // Concatente an array of arrays
    concat(rss) = fold1(((x:Object, y:Object):Object -> range_merge(x,y)), rss);
    // Map and concatentate results
    concatMap(f, xs) = concat(map(f, xs));
    // Generate an array with 1..n
    iota(n) = mtrx_iota(n, 1, 1);
in let // Problem specific
    getT(i) = range_value(rows, i, 1);
    getXs(i) = range_subset(rows, i, 2, 1);
    nrows = range_depth(rows);
    fn(j:Long):Object =
        let t0 = getT(j);
            t1 = getT(j+1);
            d = sqrt(t1-t0);
            x0s = getXs(j);
            x1s = getXs(j+1);
            g(x0, x1) = (ln(x1) - ln(x0)) / d;
        in tmap2(g, x0s, x1s);
in concatMap(fn, iota(nrows-1)).
```

Figure 16C

SYSTEM AND METHOD FOR STORING A SERIES OF CALCULATIONS AS A FUNCTION FOR IMPLEMENTATION IN A SPREADSHEET APPLICATION

STATEMENT OF RELATED PATENT APPLICATION

This non-provisional patent application is a continuation of and claims priority under 35 U.S.C. §120 to U.S. patent application Ser. No. 11/729,095, titled "System and Method for Storing a Series of Calculations as a Function for Implementation in a Spreadsheet Application," filed on Mar. 28, 2007, now abandoned which claims priority under 35 U.S.C. §119 to U.S. Provisional Patent Application No. 60/845,342, titled Dependency Graphs Tool for Excel to C++ Transformations, filed Sep. 18, 2006, the entire contents of each of which are hereby fully incorporated herein by reference.

FIELD OF THE INVENTION

The present invention relates to the field of computer-implemented spreadsheet applications. In particular, the invention provides a computer-based system and method for converting a sequence of calculations to a function and storing it as a function definition for use inside of or outside of a spreadsheet application.

BACKGROUND OF THE INVENTION

Computerized spreadsheet applications, such as Microsoft Corporation's EXCEL software product, have gained widespread use. Individuals and businesses routinely use computerized spreadsheets for a variety of purposes, such as accounting, finance, and investments. Over the years, the functionality made available to users of these spreadsheet applications has grown significantly. Business applications often use spreadsheet applications to assist in interpreting large amounts of data. In many cases, the interpretation includes conducting calculations on the data to obtain meaningful results based on the particular business objective.

In large business applications that use spreadsheet applications to evaluate data, the spreadsheets may contain a great deal of duplication, either in the data or in the formulas used with the data. The time to create these large spreadsheets can be substantial. In addition, any effort to reproduce large spreadsheets by keying in the data into the cells of the spreadsheet has a high risk of keystroke errors being interspersed within the data with lithe or no chance to find the errors. In order to avoid this problem, most users select portions of the spreadsheet that they want to copy, be it data or formulas, and paste it to another spreadsheet or another portion of the current spreadsheet. These copy and paste procedures may include hundreds or even thousands of rows of cells.

Unfortunately, the constant duplication of calculations over time can create inconsistencies. Furthermore, when a problem in a calculation is detected, it is difficult to determine where and when the problem first arose. The only way to confirm that all of the data sets that include that calculation are correct is to manually go through each data set and confirm the formula. Even if the user is capable of manually reviewing each instance of the calculation, which may have been copied and pasted hundreds of times, there is still a high probability that either through keystroke error or fatigue during the review process, an error will remain in one or more of the calculations.

Another problem with cutting and pasting large portions of data that contain calculations is that this process is prone to both accidental and intentional manipulation of the calculations. Since most users who cut and paste the calculations will not take the time to independently verify the veracity of each of the calculations prior to duplication, a user can make revisions to one or more of the calculations in order to manipulate the output data. While the above example is described as intentionally occurring, the same problem can occur accidentally and will be just as problematic.

Yet another problem with large spreadsheet applications used in the business context, where users have cut and pasted large areas of calculations numerous times, is that governmental regulators have a dim view of spreadsheets and the data that is supposedly output by the spreadsheet applications because the regulators cannot reliably determine if one row of data has a different set of formulas from another row of data.

In view of the foregoing there is a need in the art for a method to allow a spreadsheet application user to capture a sequence of calculations as a function, store the function as a function definition in a worksheet of the spreadsheet application, and provide the user with the ability to call or select a code associated with the function in the spreadsheet application. Then when the user needs to verify or modify the form of the calculation, the user only needs to review the function definition and not each use of the function in the spreadsheet application.

SUMMARY OF THE INVENTION

The dependency graph spreadsheet system can allow a spreadsheet application user to capture a sequence of calculations as a function, store the function as a function definition in a worksheet of the spreadsheet application, and provide the user with the ability to call or select a code associated with the function in the spreadsheet application. Then when the user needs to verify or modify the form of the calculation, the user only needs to review the function definition and not each invocation of the function in the spreadsheet application. The dependency graph spreadsheet system can also allow a user to capture a sequence of calculations as a function, store the function as a function definition, invoke a higher order function that uses the function as an input and generate an output from the higher order function on a range of data inputs for the function in a spreadsheet. A higher order function is a function that can take another function as one of its inputs and may output another function.

The sequence of calculations can be captured by selecting a range of cells in a spreadsheet or they can be captured by entering the sequence of calculations in a function definition worksheet or dialog box. In addition, the inputs for the function can be selected by selecting a range of cells in a spreadsheet, referencing the cells of the spreadsheet where the inputs are located in the function definition worksheet or dialog box, or reference the cell or cells that contain a handle, which may reference another location where the inputs are located. The other location can be inside or outside of the spreadsheet application.

For one aspect of the present invention, a spreadsheet application can receive a sequence of calculations or formulas in the form of a function that accepts one or more inputs and, based on those inputs, generates an output. The function can be stored as a function definition in a worksheet of the application. In one exemplary embodiment, the worksheet is a function definition worksheet. A moniker can be associated with the function definition. The moniker can include letters numbers and/or symbols and can take the form of a name or a code. The function can be invoked in a second worksheet of the spreadsheet application by inserting the moniker associated with the function into one or more cells of the worksheet.

For yet another aspect of the present invention, a spreadsheet application can accept a sequence of calculations or formulas that have been selected from within the spreadsheet application. In one exemplary embodiment, the sequence of calculations can be selected by selecting a range of cells that include the sequence of calculations. A function definition template can be generated and a moniker can be associated with a function definition that will be defined within the function definition template. The function definition template can receive inputs to the sequence of calculations in the function. The inputs can be the actual data that will be input into the sequence of calculations, the location of the data in the spreadsheet application, or a handle that references the location of the data outside of the spreadsheet application. The template can receive a location for displaying the output of the sequence of calculations. The spreadsheet application can then take the information provided in the function definition template and generate a function definition that includes the function made up of the sequence of calculations. The function can be invoked in the spreadsheet application by calling the moniker associated with the function definition in the spreadsheet application.

For still another aspect of the present invention, a spreadsheet application can accept a sequence of calculations or formulas that have been selected from within the spreadsheet application as a function. In one exemplary embodiment, the sequence of calculations can be selected by selecting a range of cells or data containers within a spreadsheet, worksheet, or workbook that include the sequence of calculations. The function can be stored as a function definition in the spreadsheet application. A moniker can be associated with the function definition. The moniker can include letters numbers and/or symbols and can take the form of a name or a code. A higher order function can be invoked in the spreadsheet application. The higher order function can take the function as one of its inputs and can be accepted as an input to the higher order function from the function definition. Inputs for the function can be received and a value can be generated for the higher order function based on the function and its inputs. The value generated can be displayed in the spreadsheet application.

BRIEF DESCRIPTION OF DRAWINGS

For a more complete understanding of the exemplary embodiments of the present invention and the advantages thereof, reference is now made to the following description in conjunction with the accompanying drawings in which:

FIG. 6 is a graphical representation illustrating a function definition worksheet in accordance with one exemplary embodiment of the present invention;

FIGS. 16A-C are lambda expression grammar and information in accordance with one exemplary embodiment of the present invention.

DETAILED DESCRIPTION OF THE EXEMPLARY EMBODIMENTS

Figure 1:
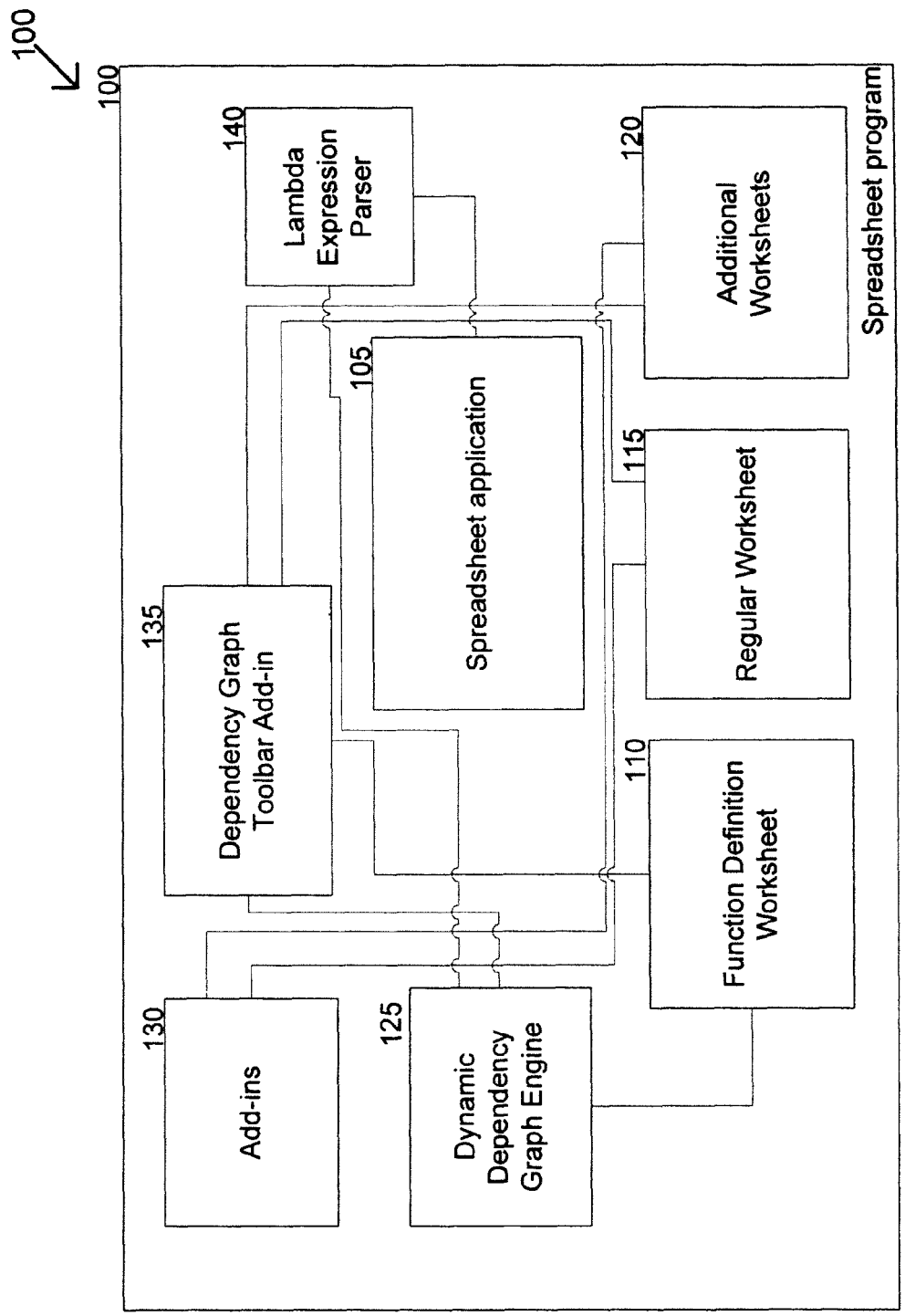
FIG. 1 is a block diagram illustrating an exemplary operating environment for implementation of various embodiments of the present invention.

The present invention supports computer-implemented methods and architecture for converting a sequence of calculations into a function and storing it as a function definition in a spreadsheet application. Exemplary embodiments of the invention can be more readily understood by reference to the accompanying figures.

Although exemplary embodiments of the present invention will be generally described in the context of a software module and an operating system running on a personal computer, those skilled in the art will recognize that the present invention can also be implemented in conjunction with other program modules for other types of computers. Furthermore, those skilled in the art will recognize that the present invention may be implemented in a stand-alone or in a distributed computing system environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

The detailed description that follows is represented largely in terms of processes and symbolic representations of operations by conventional computer components, including processing units, memory storage devices, display devices, and input devices. These processes and operations may utilize conventional computer components in a distributed computing environment.

The processes and operations performed by the computer include the manipulation of signals by a processing unit or remote computer and the maintenance of these signals within data structures resident in one or more of the local or remote memory storage devices. Such data structures impose a physical organization upon the collection of data stored within a memory storage device and represents specific electrical and magnetic elements. These symbolic representations are the means used by those skilled in the art of computer programming and computer construction to most effectively convey teachings and discoveries to others skilled in the art.

Exemplary embodiments of the present invention include a computer program that embodies the functions described herein and illustrated in the appended flowcharts and graphical representations. However, it should be apparent that there could be many different ways of implementing the invention in computer programming, and the invention should not be construed as limited to any one set of computer program instructions. Furthermore, a skilled programmer would be able to write such a computer program to implement a disclosed embodiment of the present invention without difficulty based, for example, on the flowcharts, graphical representations, and associated description of the text herein. Therefore, disclosure of a particular set of program code instructions is not considered necessary for an adequate understanding of how to make and use the present invention. The inventive functionality of the computer program will be explained in more detail in the following description and is disclosed in conjunction with the remaining figures illustrating the program flow.

Referring now to the drawings in which like numerals represent like elements throughout the several figures, aspects of the present invention and an exemplary operating environment for the implementation of the present invention will be described. FIG. 1 is a block diagram illustrating a spreadsheet program 100 constructed in accordance with an exemplary embodiment of the present invention. The exemplary spreadsheet program 100 comprises a spreadsheet application 105, a function definition worksheet 110, a regular worksheet 115, additional worksheets 120, a dynamic dependency graph 125, add-ins 130, a dependency graph toolbar add-in 135 and a lambda expression parser 140. The spreadsheet application 105 is communicably attached to the function definition worksheet 110, the regular worksheet 115, the additional worksheets 120, the dynamic dependency graph 125, the add-ins 130, the dependency graph toolbar add-in 135 and the lambda expression parser 140. In one exemplary embodiment, the spreadsheet application 105 is Microsoft EXCEL; however, those of ordinary skill in the art will recognize that other spreadsheet applications 105 may be substituted in the invention.

The function definition worksheet 110 is communicably connected to the dynamic dependency graph 125. The function definition worksheet 110 is a worksheet within the spreadsheet program 100 that includes a listing of named functions and the calculations that make up each of the named functions. The function definition worksheet 110 also includes metadata that describes the inputs and outputs of the function and documentation related to the inputs and outputs. The regular worksheet 115 and additional worksheets 120 are communicably connected to the add-ins 130 and the dependency graph toolbar add-in 135. Both the regular worksheet 115 and the additional worksheets 120 are standard spreadsheet worksheets that includes rows and columns of individual cells or data containers.

The dynamic dependency graph engine 125 is communicably connected to the function definition worksheet 110, the dependency graph toolbar add-in 135, and the lambda expression parser 140. The dynamic dependency graph engine 125 is a partially ordered, directed and acyclic graph, representing the execution of a program for a particular input. The executed operations make up the nodes of the graph and the dependencies realized during the execution form the edges of the graph. The edges in the dynamic dependency graph engine 125 force a specific order on the execution of dependent operations, which forms the complete dynamic dependency graph engine 125 into a weak ordering of the program's required operations.

Add-ins 130 is communicably connected to the regular worksheet 115 and the additional worksheets 120. The add-ins 130 provides one or more add-in XML files, each having differing names. The add-ins 130 retrieves the named add-in XML file and exposes its interface. By doing so, the add-ins 130 generates the necessary add-in implementations needed by retrieving the definitions of all the interfaces, the functions, the parameters of those functions, and all the documentation so that the add-ins 130 can generate the whole of that implementation as an add-in XML file. The dependency graph toolbar add-in 135 is communicably connected to the function definition worksheet 110 the regular worksheet 115, the additional worksheets 120, and the dynamic dependency graph engine 125. The dependency graph toolbar add-in 135 scans a function definition worksheet 110 to determine if it contains dependency calculations, generates a dynamic dependency graph, and transmits the dynamic dependency graph to the dynamic dependency graph engine 125. The lambda expression parser 140 is communicably connected to the spreadsheet application 105 and the dynamic dependency graph engine 125. The lambda expression parser 140 is an object that is capable of recognizing the elements of a lambda expression and translating each of those elements into a result.

Figure 2:
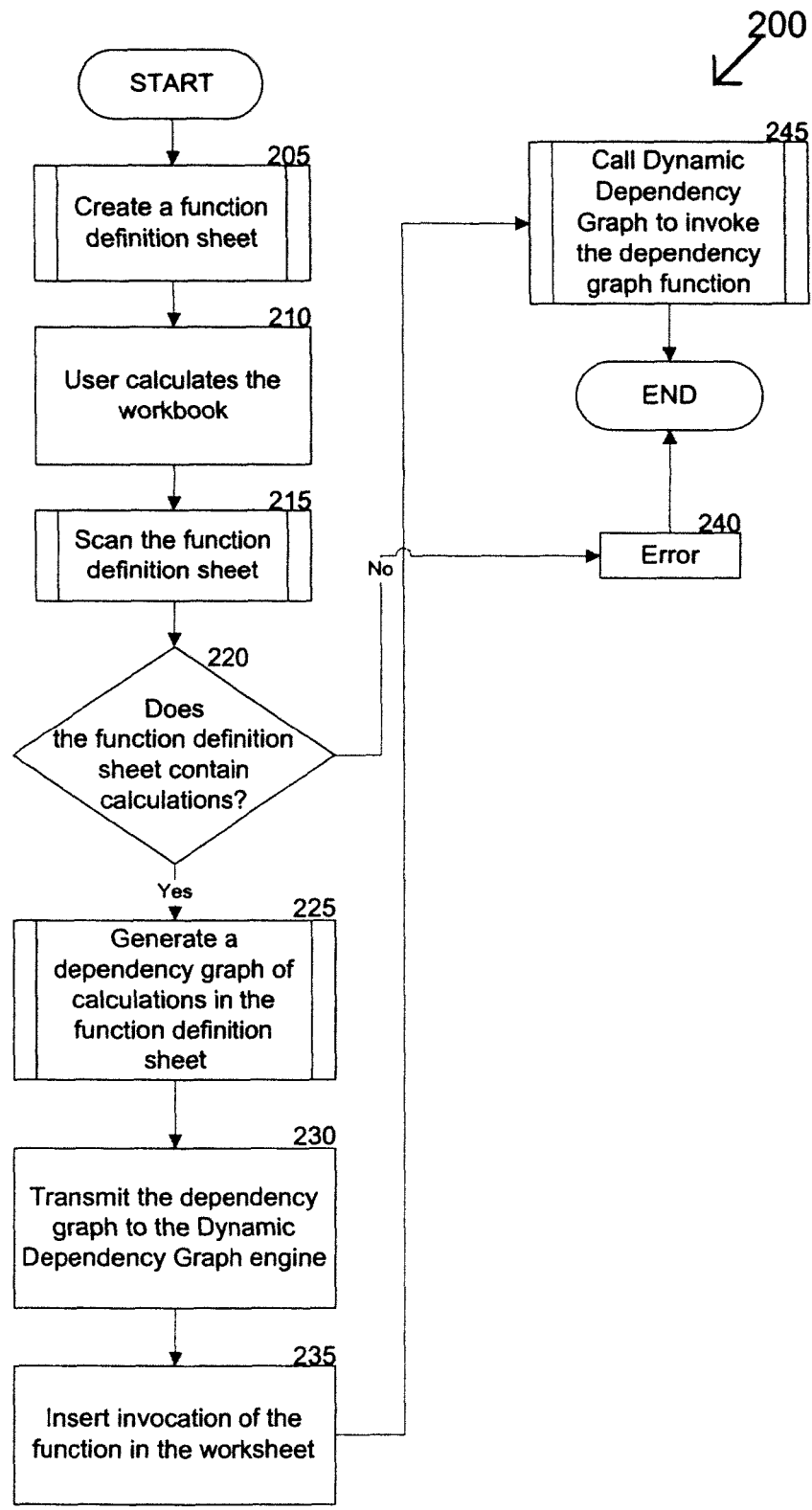
FIG. 2 is a flowchart illustrating the general steps of a process for capturing a sequence of calculations as a function and storing it as a function definition in a spreadsheet application in accordance with an exemplary embodiment of the present invention.

FIGS. 2-5 and 8-15 are logical flowchart diagrams illustrating the computer-implemented processes completed by exemplary methods for capturing a sequence of calculations as a function and storing it as a function definition in a spreadsheet application in accordance with one exemplary embodiment of the present invention. FIG. 2 is a logical flowchart diagram presented to illustrate the general steps of an exemplary process 200 for capturing a sequence of calculations as a function and storing it as a function definition in a spreadsheet application within the operating environment of the spreadsheet program 100 of FIG. 1.

Now referring to FIGS. 1 and 2, the exemplary method 200 begins at the START step and proceeds to step 205, in which a user creates a function definition worksheet 110 in the spreadsheet application 105. In step 210, the user calculates the workbook in the regular worksheet 115. The function definition worksheet 110 is scanned by the user in step 215.

In step 220, an inquiry is conducted by the dependency graph toolbar add-in 135 to determine if the function definition worksheet 110 includes calculations. In one exemplary embodiment, the dependency graph toolbar add-in 135 makes this determination by scanning the function definition worksheet 110 and evaluating the inputs and outputs of each function. If the function definition worksheet 110 does not contain any dependency calculations, the "NO" branch is followed to step 240, where an error message is generated. The process then continues to the END step. Returning to step 220, if the function definition worksheet 110 does contain dependency calculations, the "YES" branch is followed to step 225.

In step 225, the dependency graph toolbar add-in 135 generates a dynamic dependency graph of calculations that were scanned in the function definition sheet 110. In one exemplary embodiment, the dependency graph toolbar add-in 135 generates the dynamic dependency graph by tracing back through the dependencies from the outputs in the function definition worksheet 110 to the inputs in the function definition worksheet 110. The dependency graph toolbar add-in 135 transmits the dependency graph to the dynamic dependency graph engine 125 in step 230. In step 235, an invocation of the function is inserted into the worksheet 115 by the dynamic dependency graph engine 125. In step 245, the dynamic dependency graph engine 125 is called to invoke the dependency graph function. The process then continues from step 245 to the END step.

Figure 3:
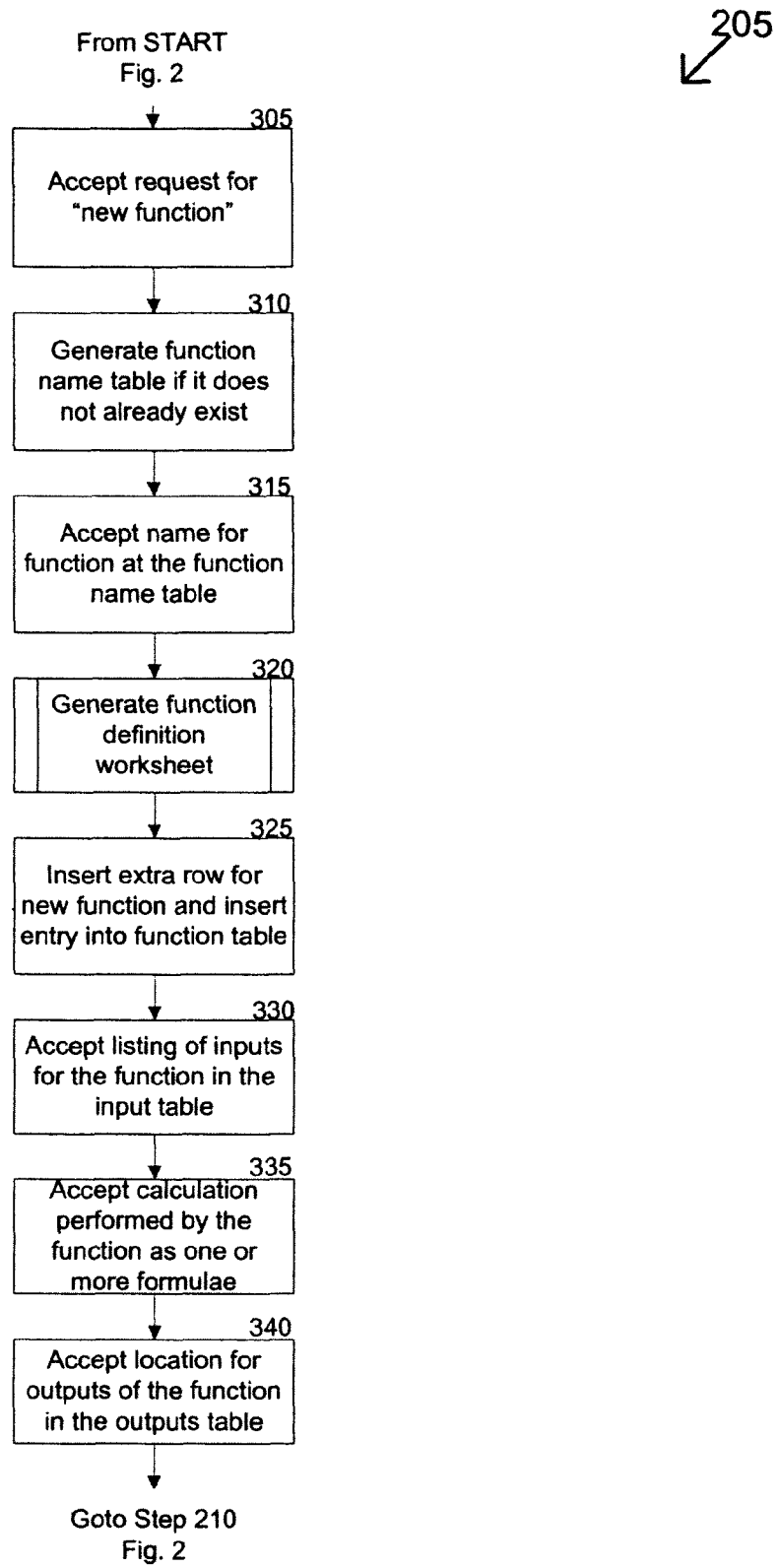
FIG. 3 is a flowchart illustrating a process for creating a function definition sheet in accordance with one exemplary embodiment of the present invention.

FIG. 3 is a logical flowchart diagram illustrating an exemplary computer-implemented method for creating a function definition sheet as completed by step 205 of FIG. 2. Referring now to FIGS. 1, 2, and 3, the exemplary method 205 begins with the spreadsheet application 105 accepting a request for a new function in the toolbar of the worksheet 115 in step 305. In step 310, the spreadsheet application 105 generates a function name table if one does not already exist. The spreadsheet application 105 accepts a name for the function in the function name table in step 315. In one exemplary embodiment, the name for the function is generated by a user of the spreadsheet application 105.

In step 320, the spreadsheet application generates a function definition worksheet 110. In one exemplary embodiment, the function definition worksheet 110 can include several rows of data corresponding to multiple functions that may be invoked by the spreadsheet application 105 in one or more of the worksheets 115, 120. FIG. 6 is a graphical representation of a function definition worksheet according to one exemplary embodiment of the present invention. Now referring to FIGS. 3 and 6, the exemplary function definition worksheet 600 includes the function name, which, in this exemplary embodiment is "My func". While the exemplary function definition worksheet 600 is represented as a single table, those of ordinary skill in the art will recognize that the function definition worksheet 600 may actually incorporate more than one table for different aspects of the functions that are being input therein.

An extra row is inserted into the function definition worksheet 110 for the insertion of a new function in step 325. In step 330, the function definition worksheet 110 accepts a listing of inputs for the function in an input table. In the exemplary function definition worksheet 600, the inputs are represented at cells C2 and C3. The function definition worksheet 110 accepts the calculation to be performed by the function as being one or more formulas in step 335. In the exemplary function definition worksheet 600, the calculation is represented at cell A8. In step 340, the function definition worksheet 110 accepts the location for the outputs for the function in the outputs table. In the exemplary function definition worksheet 600, the location of the output is represented at cell D6. The process then continues from step 340 to step 210 of FIG. 2.

Figure 4:
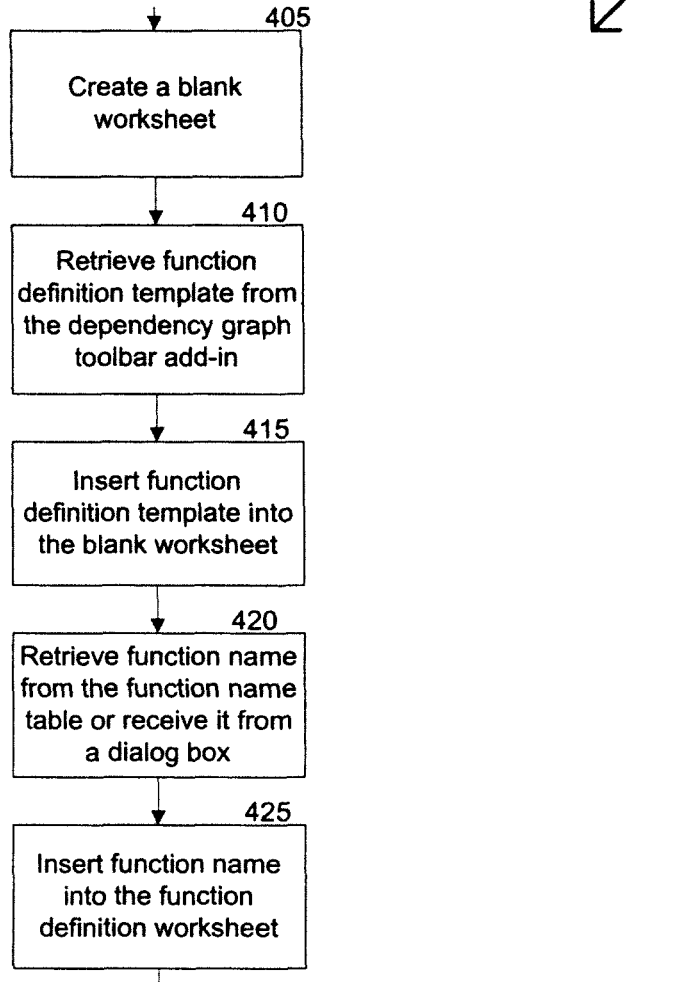
FIG. 4 is a flowchart illustrating a process for generating a function definition sheet in accordance with one exemplary embodiment of the present invention.

FIG. 4 is a logical flowchart diagram illustrating an exemplary computer-implemented method for generating a function definition worksheet 110 as completed by step 320 of FIG. 3. Now referring to FIGS. 1, 3, and 4, the exemplary method 320 begins with the spreadsheet application 105 creating a blank function definition worksheet 110 in step 405. In step 410, the spreadsheet application 105 retrieves the function definition template from the dependency graph toolbar add-in 135. The spreadsheet application 105 inserts a function definition template into the blank function definition worksheet 110 in step 415.

In step 420, the spreadsheet application 105 retrieves the function name from the function name table or receives it from a dialog box. In one exemplary embodiment, the spreadsheet application retrieves the function name from the function name table if the function was created previously and receives the function name from the dialog box if a new function is being created. In one exemplary embodiment, the function name is input into the dialog box by a user of the spreadsheet program 100. In step 425, the spreadsheet application 105 inserts the name of the function into the function definition worksheet 110. The process continues from step 425 to step 325 of FIG. 3.

Figure 5:
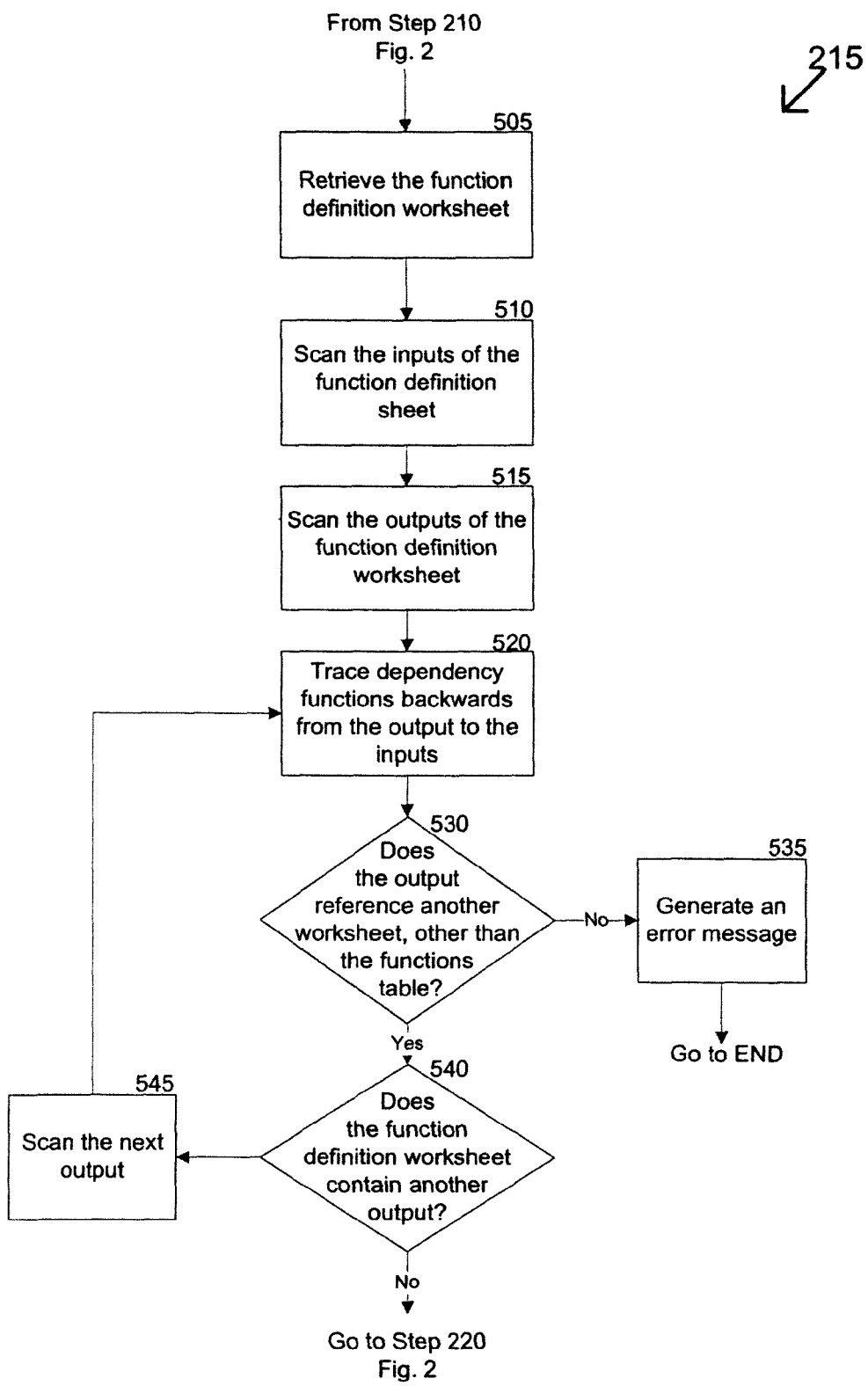
FIG. 5 is a flowchart illustrating a process for scanning the function definition sheet in accordance with one exemplary embodiment of the present invention.

FIG. 5 is a logical flowchart diagram illustrating an exemplary computer-implemented method for scanning the function definition worksheet 110 as completed by step 215 of FIG. 2. Now referring to FIGS. 1, 2, and 5, the exemplary method 215 begins with the dynamic dependency graph engine 125 retrieving the function definition worksheet 110 from the spreadsheet application 105 in step 505. In step 510, the dependency graph toolbar add-in 135 scans the inputs of the function definition worksheet 110. The dependency graph toolbar add-in 135 scans the outputs of the function definition worksheet 110 in step 515.

In step 520, the dependency graph toolbar add-in 135 traces the dependencies of each function. In one exemplary embodiment, the dependencies are traced backwards from the outputs to the inputs. In step 530, an inquiry is conducted by the dynamic dependency graph engine 125 to determine if an output in the function references another worksheet 120 other than the functions table in the functions definition worksheet 110. If the output does not reference another worksheet 120, the "NO" branch is followed to step 535 where an error message is generated in the spreadsheet application 105. The process continues from step 535 to the END step. However, if the output does reference another worksheet 120, the "YES" branch is followed to step 540.

In step 540, an inquiry is conducted by the dynamic dependency graph engine 125 to determine if the function in the function definition worksheet 110 contains another output. If the function does contain another output, the "YES" branch is followed to step 545, where the dynamic dependency graph engine 125 scans the next output in the function definition worksheet 110. The process then returns to step 520 to trace the dependencies of the function output. On the other hand, if the function does not contain another output, the "NO" branch is followed to step 220 of FIG. 2.

Figure 8:
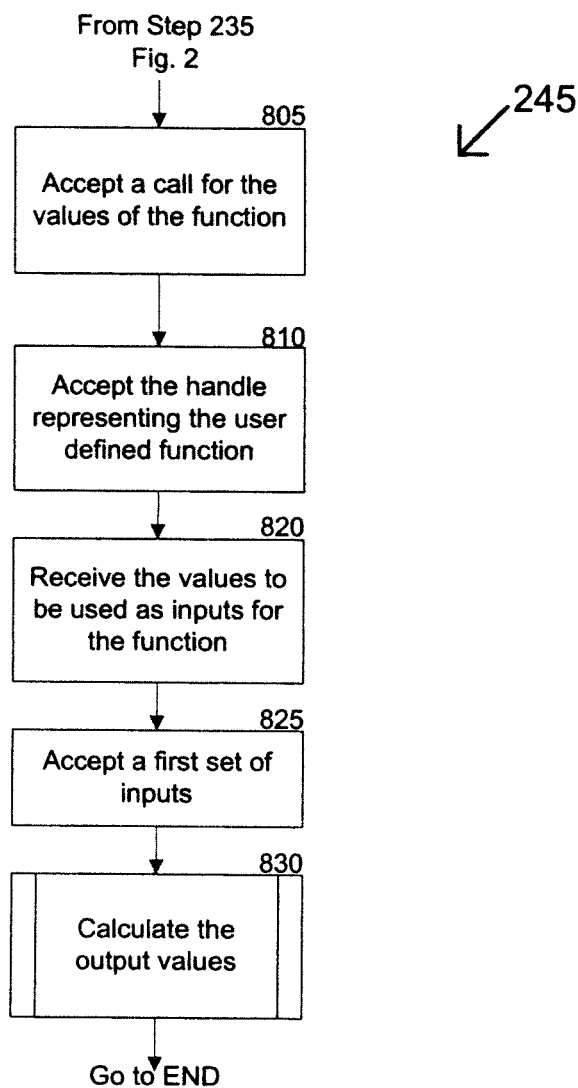
FIG. 8 is a flowchart illustrating a process for generating code to perform calculations on the worksheet in accordance with one exemplary embodiment of the present invention.

FIG. 8 is a logical flowchart diagram illustrating an exemplary computer-implemented method for generating code to perform calculations on the worksheet 115 as completed by step 245 of FIG. 2. Now referring to FIGS. 1, 2, and 8, the exemplary method 245 begins with the worksheet 115 accepting a call for the values of the function in step 805. In step 810, the worksheet 115 accepts the handle, or name, representing the user-defined function.

The values to be used as inputs to the function are received in the worksheet 115 in step 820. In one exemplary embodiment, the values used as inputs are received in the worksheet 115 by the user inserting the values into one or more cells in the spreadsheet application 105. In an alternative embodiment, the values used as inputs are referenced by a user inserting a handle into one or more cells. The handle references a location in the worksheet 115, in other worksheets 120, in a database or in another network device where the values that will be used as the inputs are located. In step 825, the dynamic dependency graph engine 125 accepts a first set of inputs. The dynamic dependency graph engine 125 calculates the output values for the first set of inputs in step 830. The process continues from step 830 to the END step.

Figure 7:
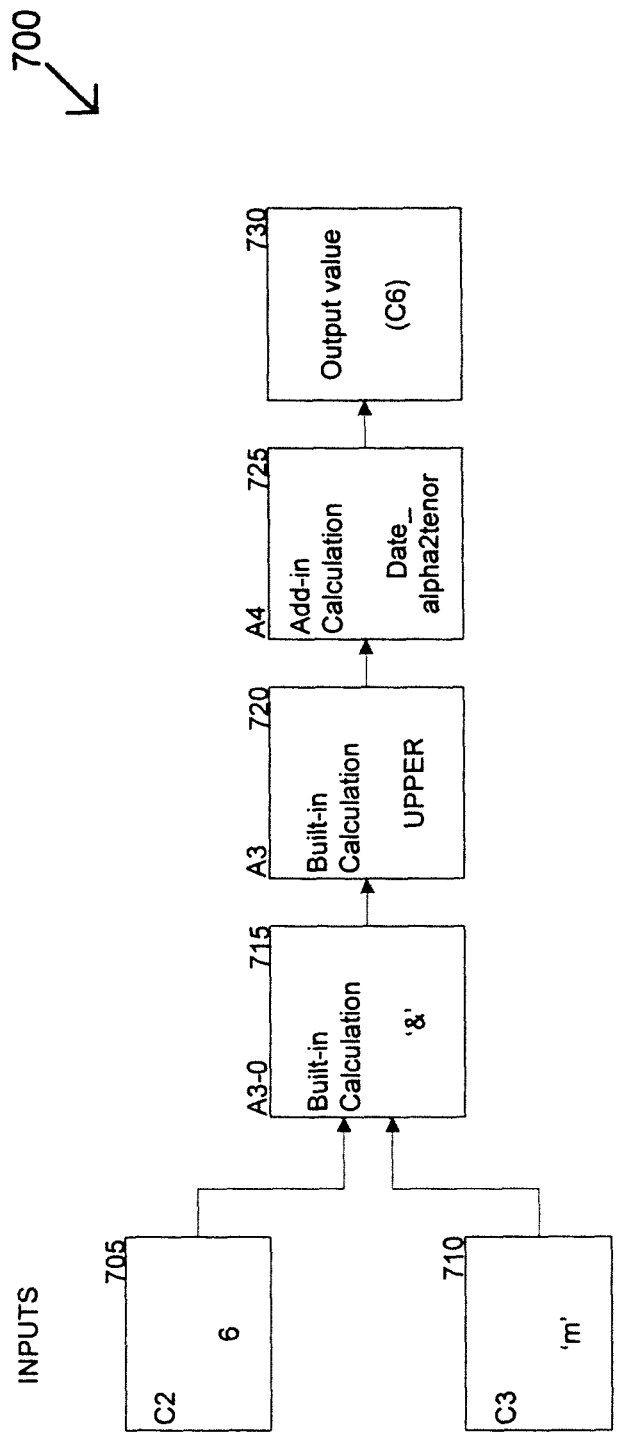
FIG. 7 is a graphical representation illustrating a dependency graph in accordance with one exemplary embodiment of the present invention.
Figure 9:
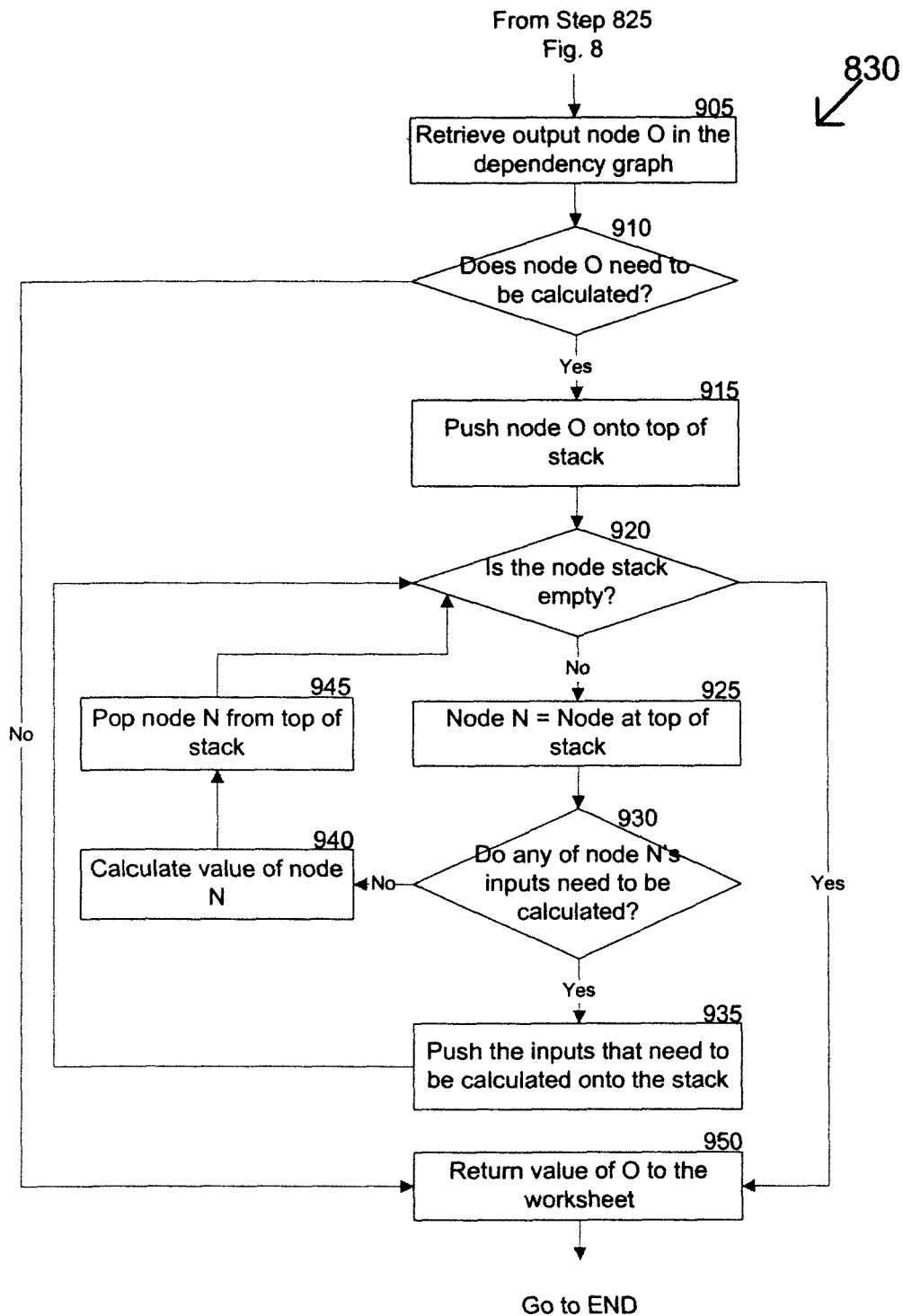
FIG. 9 is a flowchart illustrating a process for calculating the output values for calculations in the worksheet in accordance with one exemplary embodiment of the present invention.

FIG. 9 is a logical flowchart diagram illustrating an exemplary computer-implemented method for calculating the output values for functions in the worksheet as completed by step 830 of FIG. 8. Now referring to FIGS. 1, 7, 8, and 9, the exemplary method 830 begins with the dynamic dependency graph engine 125 retrieving the output node O from the dependency graph in step 905. In one exemplary embodiment, a dependency graph 700 is presented in FIG. 7. In the exemplary dependency graph 700 the output value 730 is C6. In step 910, an inquiry is conducted to determine if the node O needs to be calculated. If node O does not need to be calculated, the "No" branch is followed to step 950, where the value of node O is sent to the worksheet 115. The process continues from step 950 to the END step. Returning to step 910, if node O needs to be calculated, the "Yes" branch is followed to step 915, where the dynamic dependency graph engine 125 pushes node O onto the top of the stack.

In step 920, an inquiry is conducted to determine if the node stack is empty. If the node stack is empty, the "Yes" branch is followed to step 950. Otherwise, the "No" branch is followed to step 925, where node N is set equal to the node at the top of the stack. In step 930, an inquiry is conducted to determine if any of node N's inputs need to be calculated. For example, input A1 705 for the exemplary dependency graph 700 would not need to be calculated because it is a numerical value, as shown A2 of the function definition worksheet 600 of FIG. 6, and its value does not depend on other inputs.

If one or more of the node N's inputs need to be calculated, the "Yes" branch is followed to step 940, where the dynamic dependency graph engine 125 pushes the inputs that need to be calculated onto the stack. The process then returns from step 935 to step 920 to determine if the stack is empty. If none of node N's inputs need to be calculated, then the "No" branch is followed to step 940, where the dynamic dependency graph engine calculates the value of node N. Node N is popped from the top of the stack in step 945, and the process continues to step 920 to determine if the node stack is empty.

Figure 10:
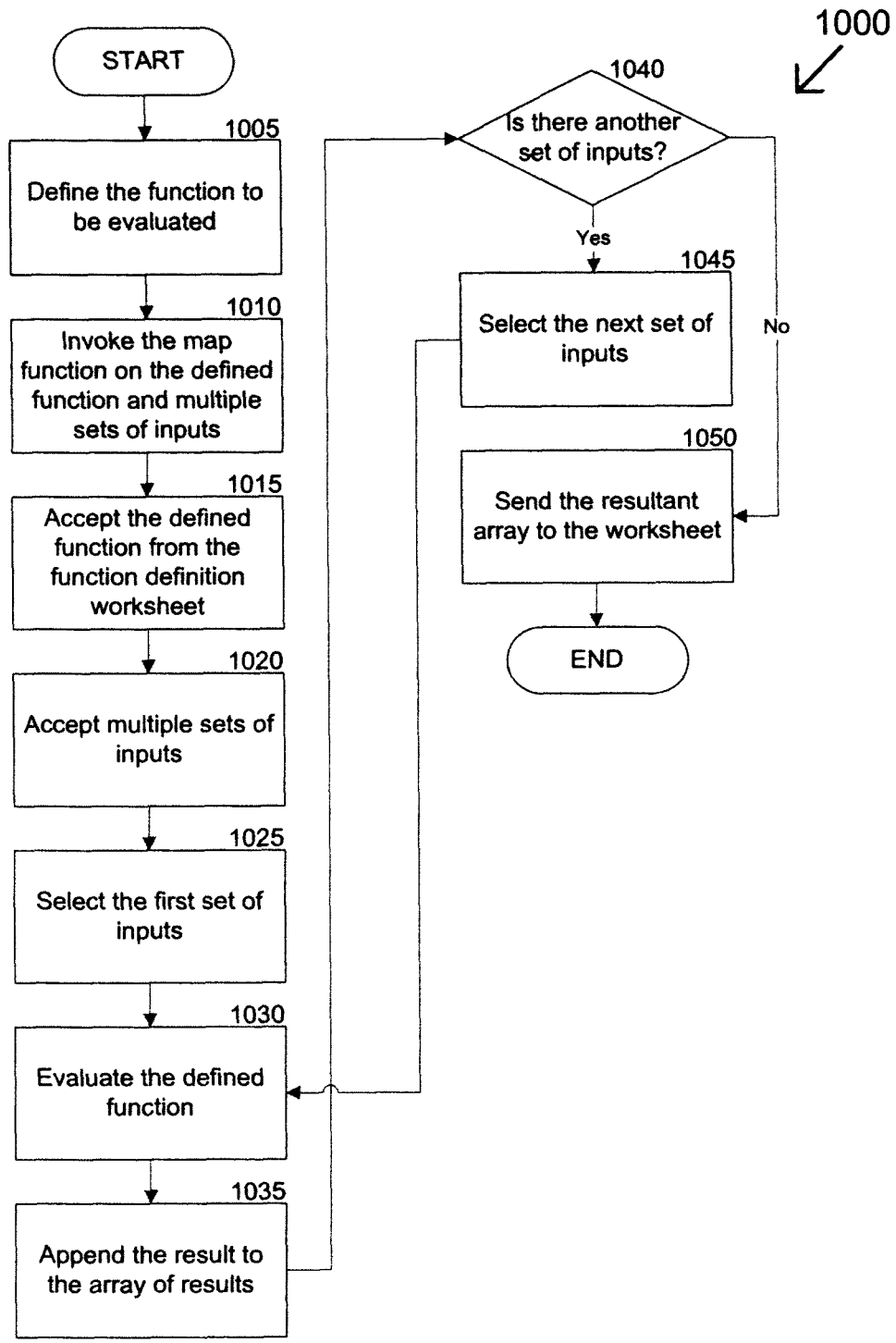
FIG. 10 is a flowchart illustrating the invocation of the higher order map function in a spreadsheet application in accordance with one exemplary embodiment of the present invention.

FIG. 10 is a logical flowchart diagram presented to illustrate the steps of an exemplary process 1000 for invoking a higher order "map" function in a spreadsheet application within the operating environment of the spreadsheet program 100 of FIG. 1. Now referring to FIGS. 1 and 10, the exemplary method 1000 begins at the START step and proceeds to step 1005, in which a function is defined in the function definition worksheet 110 as described in greater detail in steps 205-225 of FIG. 2. In step 1010, a user invokes the map function on the defined function and multiple set of inputs for the defined function in the worksheet 115.

In step 1015, the dynamic dependency graph engine 125 accepts the defined function from the function definition worksheet 110. In an alternative embodiment, the dynamic dependency graph engine 125 can accept a lambda expression or a bound function from the spreadsheet application 100. A lambda expression is an anonymous function that includes a list of parameters and a body which consists of a sequence of expressions. The list of parameters defines the environment in which the expressions are to be evaluated. The lambda expression also specifies the operations on those parameters.

A lambda expression is written as a parameter list and an optional return type list, then followed by the "→" token, and then followed by an expression. The types of parameters of a lambda expression can be explicitly or dynamically typed. An explicitly typed parameter will have its type specified in the parameter list. If the type of the parameter is not specified, or is specified as 'Variant', it is dynamically typed. Dynamically typed parameters are type checked at the time the calculation is evaluated, whereas explicitly typed parameters can be type checked when the expression is parsed. If no return types are specified, it is assumed to be a Variant and so is dynamically typed. An expression can return multiple return values. Multiple return types are specified as a comma separated list, enclosed in parenthesis.

In a lambda expression with a single parameter, the parentheses may be omitted from the parameter list. For example, a lambda expression of the form "(param)→expression" can be abbreviated "param→expression". Similarly, in a lambda expression with a single return type, the parentheses can be omitted from the return type list. The expression part of the lambda expression uses an extension of Excel formula syntax. Rather than using cell references, symbolic names from the parameter list are used.

Below are a few additional examples of lambda expressions:
//Simple, dynamically typed
x→x+1
//Same expression, with explicit types
(x:Double):Double→x+1
//Multiple arguments
(x,y)→x*y
//Multiple return values, let bindings for both a function (sqr) and a variable (c)
(x:Double):(Double, Double)→let sqr(y)=y*y; c=2 in (sqrt(sqr(x)+sqr(x+c)), sqr(x)).

However, those of ordinary skill in the art recognize that several other examples of lambda expressions exist and can be used within this invention including, but not limited to, the following lambda expression grammar and information set forth below.

Meta notation: italic indicates a non-terminal, typewriter script indicates a terminal, '::=' gives a grammar rule, '{ . . . }' is used for grouping, infix '|' indicates alternatives, postfix '?' indicates that the preceding item is optional, postfix '*' indicates that the preceding item can be repeated an arbitrary number of times.

lamExpr::=lamArgs→expr
    lamArgs::=args{:retType}?
    args::=arg|(arg{,arg}*)
    arg::=var{:type}?
    retType::=type|(type{,type}*)
    expr::=letExpr|(lamExpr)|tupleExpr|excelExpr
    excelExpr::= . . . as defined by Excel
    tupleExpr::=(expr{,expr}*)
    letExpr::=let binding{; binding}*in expr
    binding::=varBinding|funcBinding
    varBinding::=var=expr
    funcBinding::=var lamArgs=expr
    type::=Long|Double|Date|String|Object|Boolean|Variant|Long_Array|Double_Array|Date_Array|String_Array|Object_Array|Boolean_Array|Variant_Array
    var::=sequence of letters, digits, and_

The tupleExpr is used to specify multiple return values from a function. A lambda expression cannot contain references to cells, ranges, or variables defined outside the lambda expression. A further extension to the worksheet's syntax is that the notation to build arrays, i.e., {x1, x2, . . . }, works with arbitrary values and not just literals.

The term funcBinding is shorthand for binding a lambda expression. For example, the binding in expression (1) below is equivalent to expression (2).

$$var\ lamArgs = expr \quad (1)$$

$$var = (lamArgs \rightarrow expr) \quad (2)$$

Using a lamExpr, (vs→exp), inside a lambda expression is equivalent to using func_lambda("n", "vs→exp"). If the expression has free variables the translation is a little more complicated. The free variables are added to the lambda expression passed to func_lambda and func_bind is used to bind them. For example, the following is a valid lambda expression:
  (xs:Object): Object→
  let a=5;
  adda(x)=x+a
  in func_map("n", adda, xs)
The exemplary lambda expression translates to the following:
  (xs:Object): Object→
  let a=5;
  adda=func_bind("n", func_lambda("n", "(a,x)→x+a"), a)
in func_map("n", adda, xs).

Functions defined using funcBinding can be used with regular function application syntax within the lambda expression. This translates to a call to func_value. The following is an example:
  (x:Double): Double→
  let sqr(y)=y*y
  in sqrt(sqr(x)+sqr(x+1))
And it translates to the following
  (x:Double): Double→
  let sqr=func_lambda("n", "y→y*y")
  in sqrt(func_value("n", sqr, x)+ func_value("n", sqr, x+1)).

The following is an example of a basic mapping function in the form of a lambda expression, in which the worksheet expression returns a range with all values incremented by 1:
  =func_map("n","(x)→x+1",C7:C11).

The following is an example of a function, in the form of a lambda expression, that computes the harmonic mean of its argument range:
  (r:Object):Double→range_depth(r)/func_fold("n", ((s:Double, x:Double)→s+1/x), 0,r)

A more verbose, and perhaps readable, version of the function above would be as follows:
  (r:Object):Double→
  let len=range_depth(r);
  total=func_fold("n", ((s:Double, x:Double)→s+1/x), 0, r);
  in len/total.

The following is an example of a function, in the form of a lambda expression that returns a range where each element is divided by the harmonic mean of the whole range:
  (r:Object):Double→
  let hm=range_depth(r)/func_fold("n", ((s:Double, x:Double)→s+1/x), 0, r);
  in func_map("n", ((x)→x/hm), r).

The following is a more complicated version of a lambda expression. This example below resents one method for operating on pairs of rows at a time. It is done in the example below by mapping not over the rows themselves, but instead over the indicies of the range.
  (rows:Object):Object→
  let
  f(j:Long):Object=
  let t0=range_value(rows, j, 1);
    t1=range_value(rows, j+1, 1);
    d=sqrt(t1−t0);
    x0s=range_subset(rows, j, 2, 1);
    x1s=range_subset(rows, j+1, 2, 1);
    x01s=range_merge(x0s, x1s);
    g(x0:Double, x1:Double)=(ln(x1)−ln(x0))/d
  in range_transpose(func_map("n", g, range_transpose(x01s))) in func_map("n", f, mtrx_iota(range_depth(rows)−1, 1, 1))

Immediately below is the same example as above in a more verbose form:
  (rows:Object):Object→
  //Generic definitions:
  let
  //Less verbose func_map
  map(f,xs)=func_map("n", f, xs);
  //Transposed map; maps over columns
  tmap(f,xs)=range_transpose(map(f, range_transpose(xs)));
  //Transposed map over two arguments
  tmap2(f, xs, ys)=tmap(f, range_merge(xs, vs));
  //Less verbose func_fold
  fold(f,z,xs)=func_fold("n", f, z, xs);
  //Fold over non-empty array, no zero element
  fold1(f,rs)=fold(f, range_value(rs, 1, 1), range_subset(rs, 2, 1));
  //Concatente an array of arrays
  concat(rss)=fold1(((x:Object, y:Object):Object→range_merge(x,y)), rss);
  //Map and concatenate results
  concatMap(f, xs)=concat(map(f, xs));
  //Generate an array with 1 . . . n
  iota(n)=mtrx_iota(n, 1, 1);
  in
  let//Problem specific
  getT(i)=range_value(rows, i, 1);
  getXs(i)=range_subset(rows, i, 2, 1);
  nrows=range_depth(rows);
  fn(j:Long):Object=
  let t0=getT(j);
    t1=getT(j+1);
    d=sqrt(t1−t0);
    x0s=getXs(j);
    x1s=getXs(j+1);
    g(x0,x1)=(ln(x1)−ln(x0))/d;
  in tmap2(g, x0s, x1s);
  in concatMap(fn, iota(nrows−1)).

The dynamic dependency graph engine 125 accepts multiple sets of inputs for the defined function in step 1020. In one exemplary embodiment, the inputs are selected by the user selecting one or more cells in the spreadsheet application 105. In an alternative embodiment, the inputs are selected by a user selecting a cell that contains a handle. The handle references another location in the spreadsheet application 105 a location in a database or another network device where the data that will be used as the inputs is located. In this exemplary embodiment, the user can select a single cell that contains multiple sets of inputs for the defined function.

In step 1025, the dynamic dependency graph engine 125 selects the first set of inputs. The defined function is evaluated in step 1030. In step 1035, the results of the evaluation are appended to an array of results.

In step 1040, an inquiry is conducted by the dynamic dependency graph engine 125 to determine if there is another set of inputs to be evaluated from the multiple sets of inputs received in step 1020. If there are additional inputs, the "Yes" branch is followed to step 1045, where the dynamic dependency graph engine 125 selects the next set of inputs. The process then returns to step 1030 to evaluate the defined function again. On the other hand, if there are no additional inputs, the "No" branch is followed from step 1040 to step 1050, where the dynamic dependency graph engine 125 transmits the resultant value from the defined function to the worksheet 115. The process continues from step 1050 to the END step.

Figure 11:
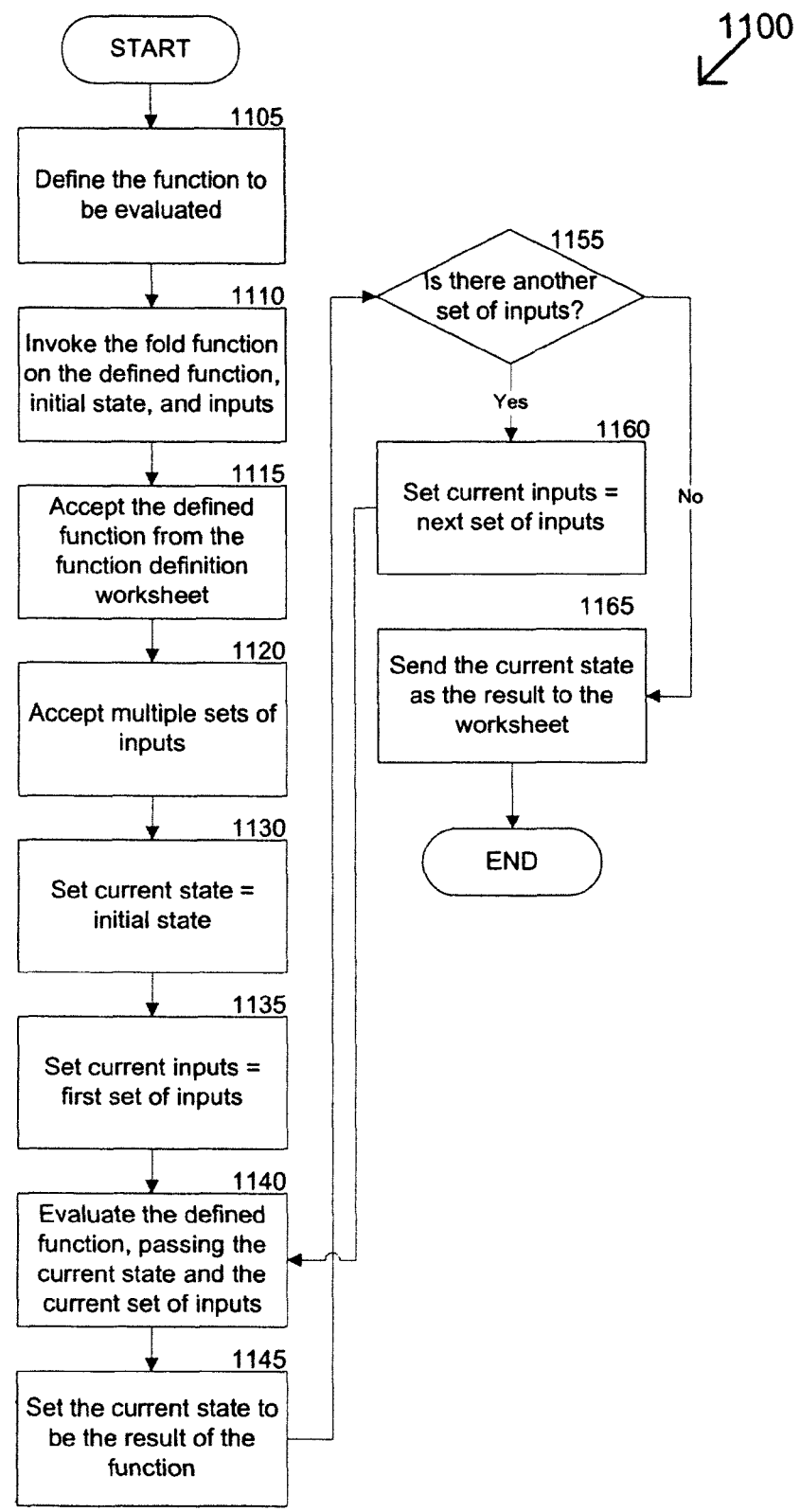
FIG. 11 is a flowchart illustrating the invocation of the higher order fold function in a spreadsheet application in accordance with one exemplary embodiment of the present invention.

FIG. 11 is a logical flowchart diagram presented to illustrate the steps of an exemplary process 1100 for invoking a higher order "fold" function in a spreadsheet application within the operating environment of the spreadsheet program 100 of FIG. 1. Now referring to FIGS. 1 and 11, the exemplary method 1100 begins at the START step and proceeds to step 1105, in which a function is defined in the function definition worksheet 110 as described in greater detail in steps 205-225 of FIG. 2. In step 1110, a user invokes the fold function on the defined function, the initial state, and the set of inputs for the defined function in the worksheet 115.

In step 1115, the dynamic dependency graph engine 125 accepts the defined function from the function definition worksheet 110. In an alternative embodiment, the dynamic dependency graph engine 125 can accept a lambda expression or a bound function from the spreadsheet application 100. In step 1120, the dynamic dependency graph engine 125 accepts multiple sets of inputs for the defined function. In one exemplary embodiment, the inputs are selected by the user selecting one or more cells in the spreadsheet application 105. In an alternative embodiment, the inputs are selected by a user selecting a cell that contains a handle. The handle references another location in the spreadsheet application a location in a database or another network device where the data that will be used as the inputs is located. In this exemplary embodiment, the user can select a single cell that contains multiple sets of inputs for the defined function.

In step 1130, the dynamic dependency graph engine 125 sets the current state for the defined function equal to the initial state. The dynamic dependency graph engine 125 sets the current inputs for the defined function equal to the first set of inputs in step 1135. In step 1140, the dynamic dependency graph engine 125 evaluates the defined function and passes the current state and the current set of inputs. The dynamic dependency graph engine 125 sets the current state to be the result of the function in step 1145.

In step 1155, an inquiry is conducted by the dynamic dependency graph engine 125 to determine if there is another set of inputs to be evaluated from the multiple sets of inputs received in step 1125. If there are additional inputs, the "Yes" branch is followed to step 1160, where the dynamic dependency graph engine 125 sets the current set of inputs equal to the next set of inputs. The process then returns to step 1140 for another evaluation of the defined function. On the other hand, if there are no additional inputs, the "No" branch is followed from step 1155 to step 1165, where the dynamic dependency graph engine 125 sends the current state as the result to the worksheet 115. The process continues from step 1165 to the END step.

Figure 12:
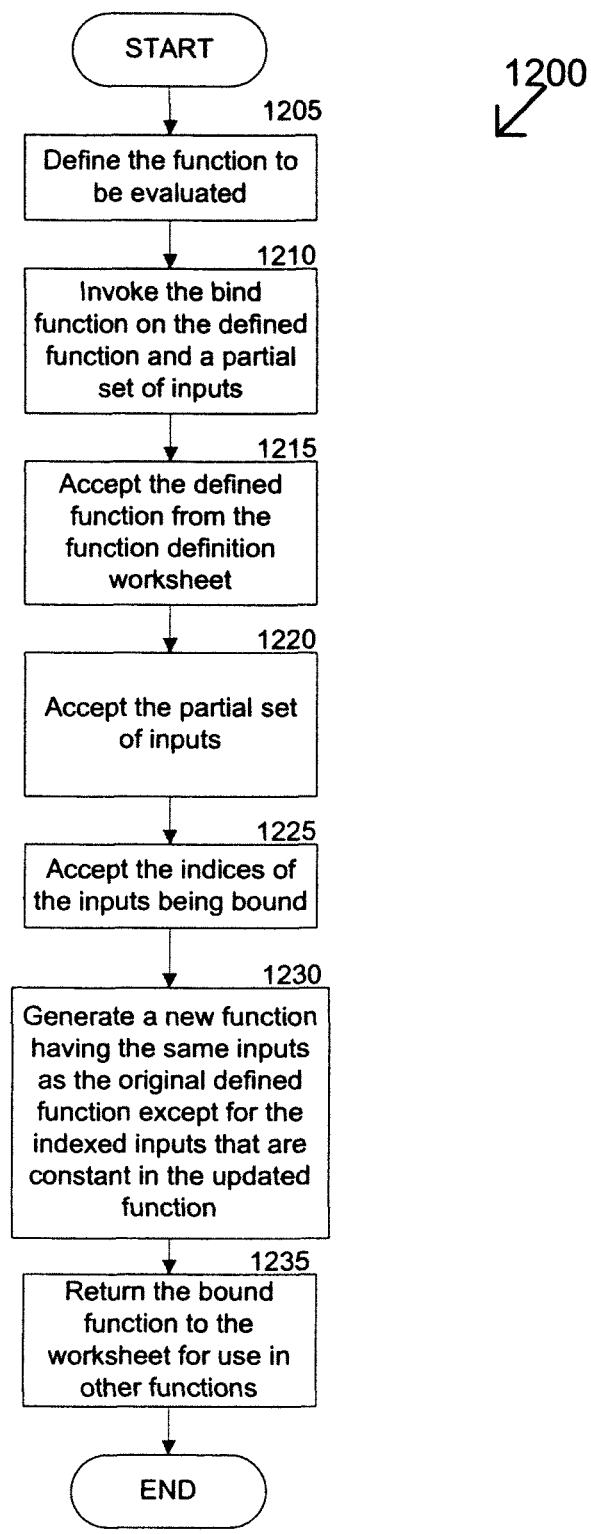
FIG. 12 is a flowchart illustrating the invocation of the higher order bind function in a spreadsheet application in accordance with one exemplary embodiment of the present invention.

FIG. 12 is a logical flowchart diagram presented to illustrate the steps of an exemplary process 1200 for invoking a higher order "bind" function within the operating environment of the spreadsheet program 100 of FIG. 1. Now referring to FIGS. 1 and 12, the exemplary method 1200 begins at the START step and proceeds to step 1205, in which a function is defined in the function definition worksheet 110 as described in greater detail in steps 205-225 of FIG. 2. In step 1210, a user invokes the bind function on the defined function and a partial set of inputs for the defined function in the worksheet 115.

In step 1215, the dynamic dependency graph engine 125 accepts the defined function from the function definition worksheet 110. In an alternative embodiment, the dynamic dependency graph engine 125 can accept a lambda expression or a bound function from the spreadsheet application 100. The dynamic dependency graph engine 125 accepts the partial set of inputs for the defined function from the worksheet 115 or via a handle in one of the cells of the worksheet 115 in step 1220. The dynamic dependency graph engine accepts the indices of the inputs that are being bound via the bind function, from the worksheet 115 in step 1225. In one exemplary embodiment, the selection of indices fixes one or more of the inputs to the function to a specific value. For example, if a function takes as its inputs today's date, current interest rate, a future cash-flow date and the amount of money that is the cash flow on that date and the user invokes the bind function and passes as indices to the dynamic dependency graph engine 125 today's date and the current interest rate, then the bind function will generate another function that takes two inputs (a future cash-flow date and the amount of money that is the cash flow on that date) instead of four as was previously the case, and today's date and the current interest rate will remain as constants for all input sets.

The dynamic dependency graph engine 125 generates a new function having the same inputs as the original defined function except for the indexed inputs that are constant in the updated function in step 1230. In step 1235, the dynamic dependency graph engine 125 returns the bound function to the function definition worksheet 110 for use in other functions. The process continues from step 1235 to the END step.

Figure 13:
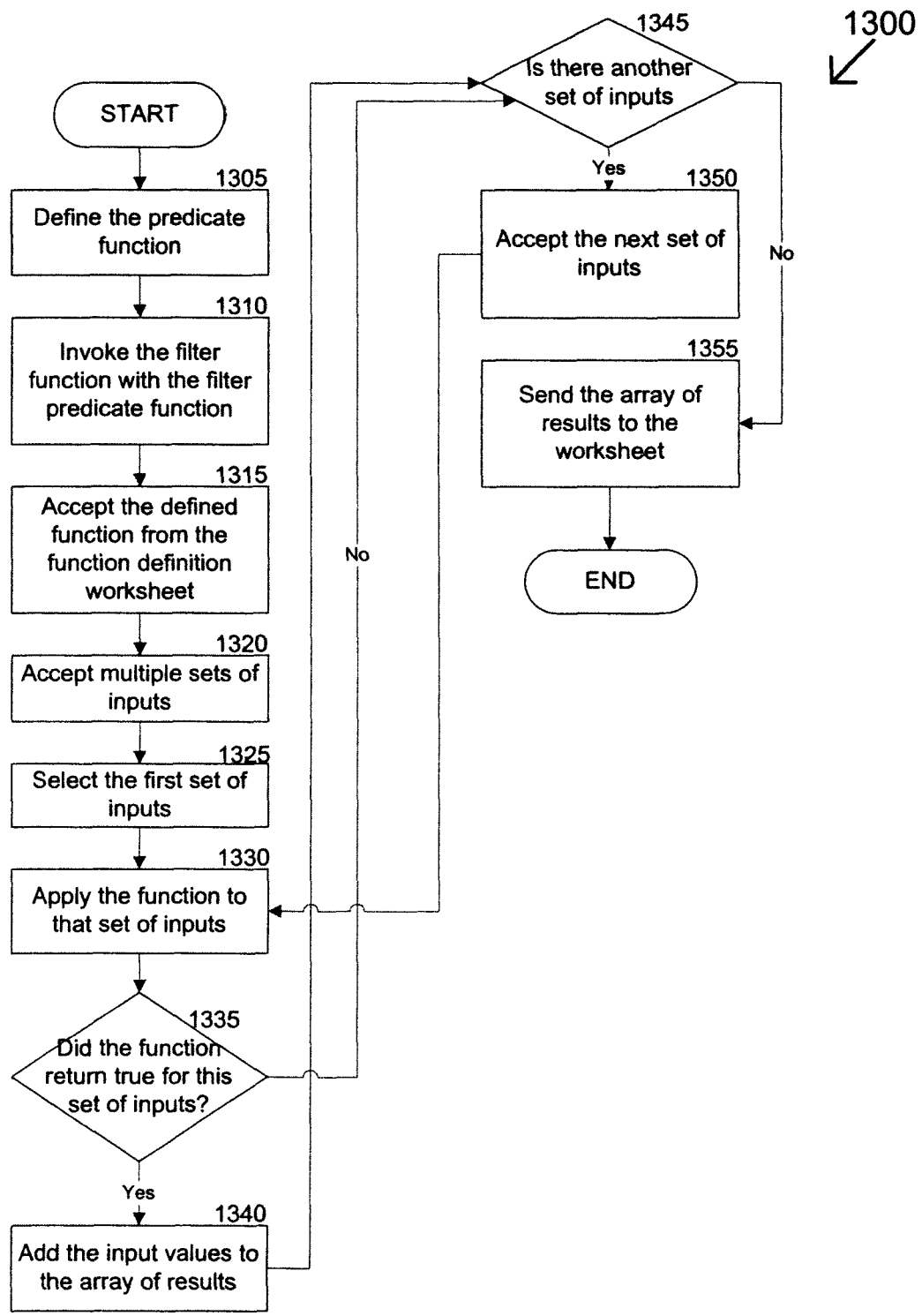
FIG. 13 is a flowchart illustrating the invocation of the higher order filter function in a spreadsheet application in accordance with one exemplary embodiment of the present invention.

FIG. 13 is a logical flowchart diagram presented to illustrate the steps of an exemplary process 1300 for invoking a higher order "filter" function within the operating environment of the spreadsheet program 100 of FIG. 1. Now referring to FIGS. 1 and 13, the exemplary method 1300 begins at the START step and proceeds to step 1305, where a predicate function is defined in the function definition worksheet 110 as described in greater detail in steps 205-225 of FIG. 2. In step 1310, a user invokes the filter function on the defined predicate function. In one exemplary embodiment, the filter predicates are the values that must be included in a row or set of inputs for that row or set of inputs to be presented as inputs to the defined function.

In step 1315, the dynamic dependency graph engine 125 accepts the defined function from the function definition worksheet 110. In an alternative embodiment, the dynamic dependency graph engine 125 can accept a lambda expression or a bound function from the spreadsheet application 100. The dynamic dependency graph engine 125 accepts multiple sets of inputs for the defined predicate function in step 1320. In one exemplary embodiment, the inputs are selected by the user selecting one or more cells in the spreadsheet application 105. In an alternative embodiment, the inputs are selected by a user selecting a cell that contains a handle. The handle references another location in the spreadsheet application a location in a database or another network device where the data that will be used as the inputs is located. In this exemplary embodiment, the user can select a single cell that contains multiple sets of inputs for the defined function.

In step 1325, the first set of inputs are selected and the predicate function is applied to the first set of inputs in step 1330. In step 1335, an inquiry is conducted by the dynamic dependency graph engine 125 to determine if the predicate function returned true for this set of inputs. If so, the "Yes" branch is followed to step 1340, where the dynamic dependency graph engine 125 adds the input values to an array of results. Returning to step 1335, if the predicate function does not return true for this set of inputs, the "No" branch is followed to step 1345.

In step 1345, an inquiry is conducted by the dynamic dependency graph engine 125 to determine if there is another set of inputs to be evaluated from the multiple sets of inputs received in step 1320. If there are additional inputs, the "Yes" branch is followed to step 1350, where the dynamic dependency graph engine 125 accepts the next set of inputs. The process then returns to step 1330 to apply the predicate function to that set of inputs. On the other hand, if there are no additional inputs, the "No" branch is followed from step 1345 to step 1355, where the dynamic dependency graph engine 125 sends the array of results to the worksheet 115. The process continues from step 1355 to the END step.

Figure 14:
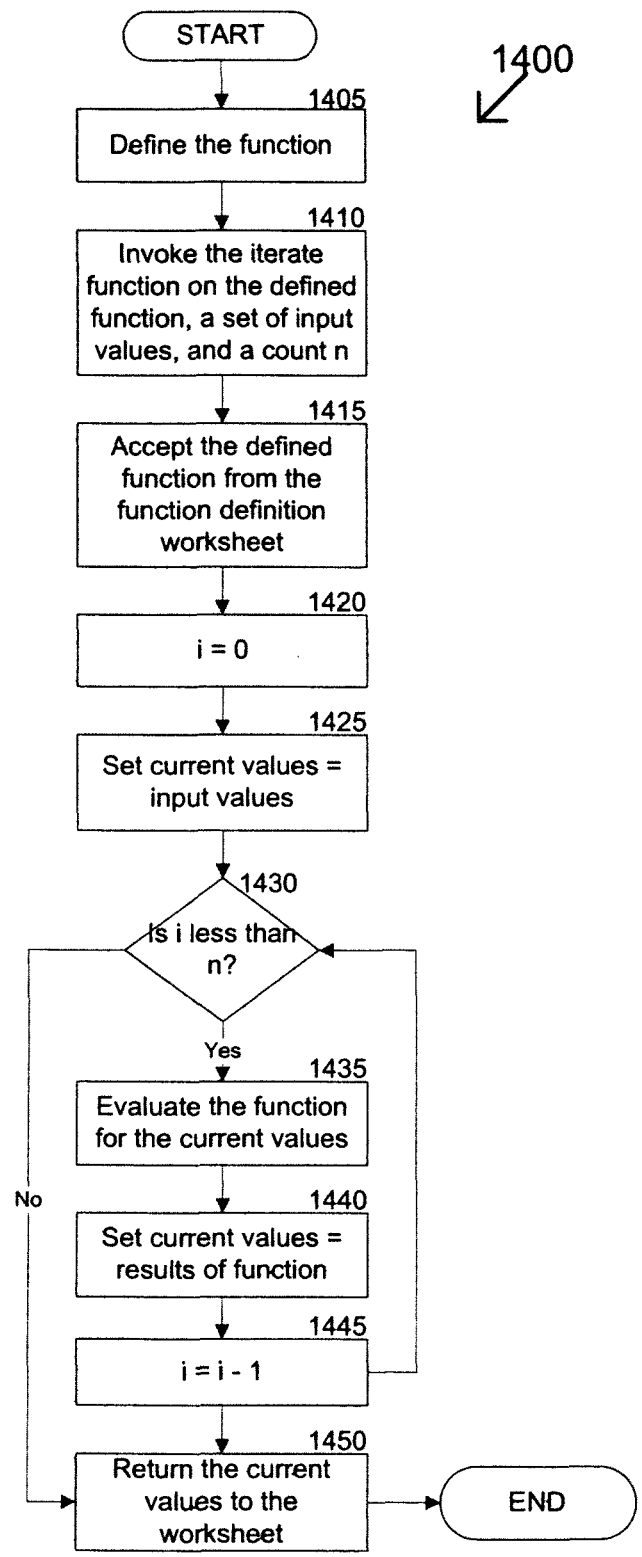
FIG. 14 is a flowchart illustrating the invocation of the higher order iterate function in a spreadsheet application in accordance with one exemplary embodiment of the present invention.

FIG. 14 is a logical flowchart diagram presented to illustrate the steps of an exemplary process 1400 for invoking a higher order "iterate" function within the operating environment of the spreadsheet program 100 of FIG. 1. Now referring to FIGS. 1 and 14, the exemplary method 1400 begins at the START step and proceeds to step 1405, in which a function is defined in the function definition worksheet 110 as described in greater detail in steps 205-225 of FIG. 2. In step 1410, a user invokes the iterate function on the defined function, a set of input values in the worksheet 115, and a count n. In one exemplary embodiment, the count n is an iteration value that represents a limit on the number of iterations to be completed by the iterate function.

In step 1415, the dynamic dependency graph engine 125 accepts the defined function from the function definition worksheet 110. In an alternative embodiment, the dynamic dependency graph engine 125 can accept a lambda expression or a bound function from the spreadsheet application 100. Counter variable i is set equal to zero in step 1420. In one exemplary embodiment, the counter variable i is an iteration counter. In step 1425, the dynamic dependency graph engine 125 sets the current values equal to the input values. In step 1430, an inquiry is conducted to determine if counter variable i is less than variable n. If so, the "Yes" branch is followed to step 1435, where the dynamic dependency graph engine 125 evaluates the function for the current values.

In step 1440, the dynamic dependency graph engine 125 sets the current values equal to the results of the function. The value of counter variable i is reduced by one in step 1445 and the process returns to step 1430 to reevaluate counter variable i in comparison to variable n. Returning to step 1430, if counter variable i is not less than variable n, the "No" branch is followed to step 1450, where the dynamic dependency graph engine 125 returns the current values to the worksheet 115. The process continues from step 1450 to the END step.

Figure 15:
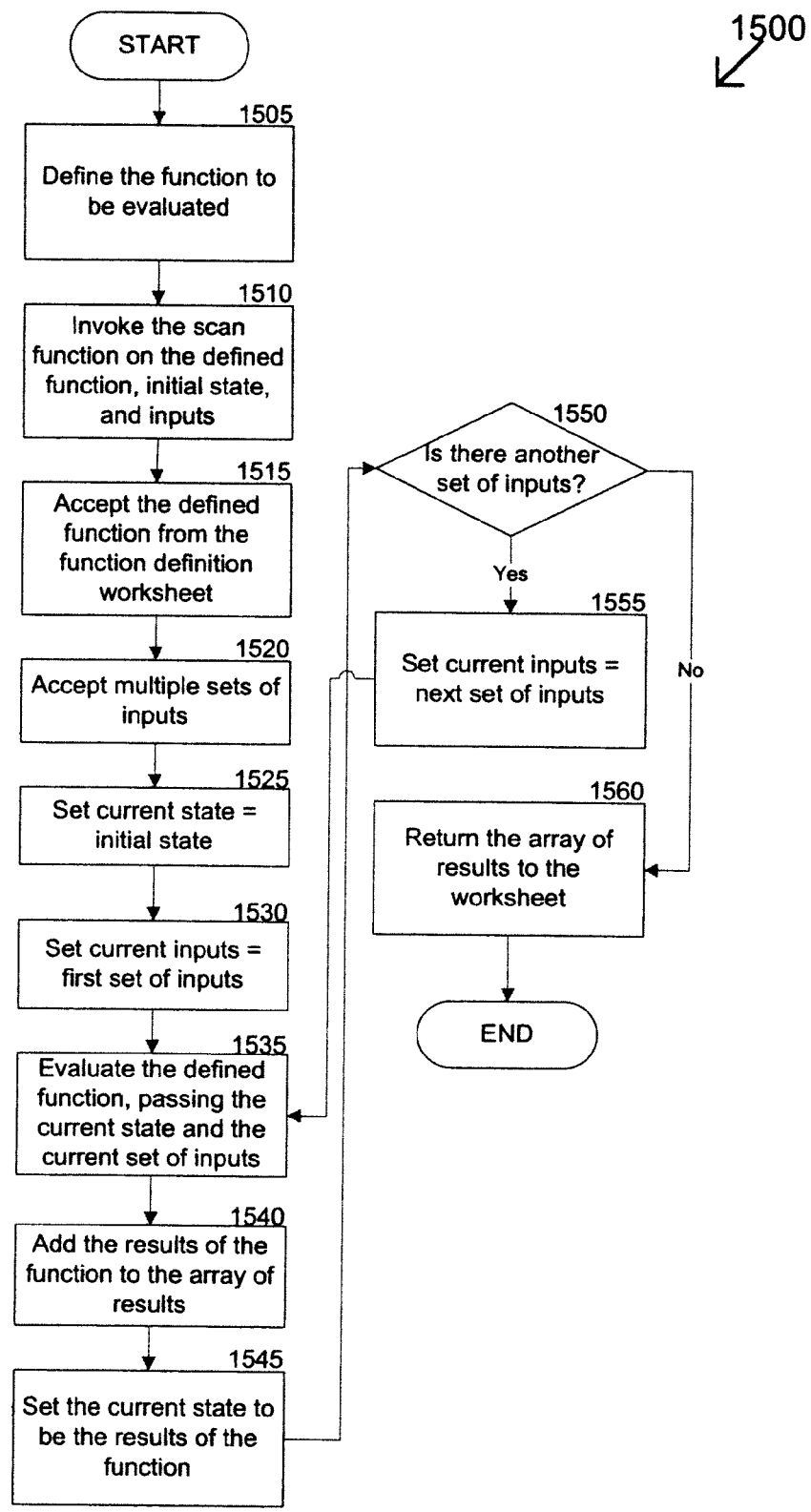
FIG. 15 is a flowchart illustrating the invocation of the higher order scan function in a spreadsheet application in accordance with one exemplary embodiment of the present invention.

FIG. 15 is a logical flowchart diagram presented to illustrate the steps of an exemplary process 1500 for invoking a higher order "scan" function within the operating environment of the spreadsheet program 100 of FIG. 1. Now referring to FIGS. 1 and 15, the exemplary method 1500 begins at the START step and proceeds to step 1505, where a function is defined in the function definition worksheet 110 as described in greater detail in steps 205-225 of FIG. 2. In step 1510, a user invokes the scan function on the defined function, the initial state, and the set of inputs for the defined function in the worksheet 115.

In step 1515, the dynamic dependency graph engine 125 accepts the defined function from the function definition worksheet 110. In an alternative embodiment, the dynamic dependency graph engine 125 can accept a lambda expression or a bound function from the spreadsheet application 100. In step 1520, the dynamic dependency graph engine 125 accepts multiple sets of inputs. The current state is set equal to the initial state by the dynamic dependency graph engine 125 in step 1525. In step 1530, the current inputs are set equal to the first set of inputs that were accepted by the dynamic dependency graph engine 125.

The defined function is evaluated and the current state and current set of inputs are passed by the dynamic dependency graph engine in step 1535. In step 1540, the dynamic dependency graph engine 125 adds the results of the function to an array of results. The dynamic dependency graph engine 125 sets the current state to be the results of the function in step 1545. In step 1550, an inquiry is conducted by the dynamic dependency graph engine 125 to determine if there is another set of inputs to be evaluated from the multiple sets of inputs received in step 1520. If there are additional inputs, the "Yes" branch is followed to step 1555, where the dynamic dependency graph engine 125 sets the current inputs equal to the next set of inputs. The process then returns to step 1535 to determine evaluate the function in light of the next set of inputs. On the other hand, if there are no additional inputs, the "No" branch is followed to step 1560, where the dynamic dependency graph engine 125 transmits the array of results to the worksheet 115. The process continues from step 1560 to the END step.

In conclusion, the present invention supports a computer-implemented method for allowing a spreadsheet application user to capture a sequence of calculations as a function, store the function as a function definition in a worksheet of the spreadsheet application, and provide the user with the ability to call or select a code associated with function in the spreadsheet application. Therefore, when the user needs to verify or modify the form of the calculation, the user need only to review function definition and not each use of the function in the spreadsheet application. It will be appreciated that the present invention fulfills the needs of the prior art described herein and meets the above-stated objectives. While there have been shown and described several exemplary embodiments of the present invention, it will be evident to those of ordinary skill in the art that various modifications and changes may be made thereto without departing from the spirit and the scope of the present invention as set forth in the appended claims and equivalences thereof.

We claim:

1. A computer-implemented method for invoking a sequence of calculations in a spreadsheet application comprising:
   a. accepting the sequence of calculations as a function in the spreadsheet application;
   b. storing the function as a function definition in a first worksheet of the spreadsheet application;
   c. associating a moniker with the function definition;
   d. invoking the function in a cell of a second worksheet by inserting the moniker associated with the function definition into the cell of the second worksheet in the spreadsheet application;
   e. scanning at least one input to the sequence of calculations in the function definition;
   f. scanning at least one output from the sequence of calculations in the function definition;
   g. determining the inputs that each output is dependent on in order to calculate the output;
   h. generating a dependency graph for the sequence of calculations in the function definition;
   i. receiving an output node for an output in the dependency graph;
   j. determining if the output node needs to be calculated;

k. positioning the output node onto the top of a stack based on a positive determination that the output node needs to be calculated;

l. determining if any of the input values for the output node need to be calculated before generating the value of the output node;

m. calculating the input value based on a positive determination that the input value needs to be calculated;

n. repeating steps (l)-(m) for each input value for the output node; and o. calculating the output node.

2. The computer-implemented method of claim 1, wherein storing the function as a function definition further comprises the steps of:

generating a function definition template in the first worksheet;

receiving the moniker to be associated with the function definition in the function definition template;

receiving an input to the sequence of calculations in the function definition template;

receiving a location for displaying the output to the sequence of calculations in the function definition template;

receiving the sequence of calculations;

storing the sequence of calculations as a function in the function definition template; and generating the function definition in the first worksheet.

3. The computer-implemented method of claim 2, wherein the function definition template comprises a function name table, an input table and an output table.

4. The computer-implemented method of claim 2, wherein the moniker is selected from a plurality of monikers in a function name table in the first worksheet.

5. The computer-implemented method of claim 2, wherein the moniker is received as a user input in a dialog box in the spreadsheet application.

6. The computer-implemented method of claim 2, wherein the sequence of calculations are received as a user-input in the function definition template.

7. The computer-implemented method of claim 2, wherein the sequence of calculations are received by a selection of at least one cell in the second worksheet.

8. A computer-implemented method for invoking a sequence of calculations in a spreadsheet application comprising:

a. accepting the sequence of calculations as a function in the spreadsheet application;

b. storing the function as a function definition in a first worksheet of the spreadsheet application;

c. associating a moniker with the function definition;

d. invoking the function in a cell of a second worksheet by inserting the moniker associated with the function definition into the cell of the second worksheet in the spreadsheet application;

e. scanning at least one input to the sequence of calculations in the function definition;

f. scanning at least one output from the sequence of calculations in the function definition;

g. determining the inputs that each output is dependent on in order to calculate the output;

h. generating a dependency graph for the sequence of calculations in the function definition;

i. invoking a map function in at least one cell of the second worksheet, wherein the map function comprises the moniker associated with the function definition;

j. accepting the function from the function definition;

k. accepting a plurality of sets of inputs for the function;

l. generating a value for the function based on a first set of inputs;

m. appending the value to an array of results;

n. determining if there is another set of inputs for the function;

o. repeating steps (l)-(n) for each additional set of inputs for the function based on a positive determination that there is an another set of inputs; and p. displaying the array of results in the second worksheet.

9. A computer-implemented method for invoking a sequence of calculations in a spreadsheet application comprising:

a. accepting the sequence of calculations as a function in the spreadsheet application;

b. storing the function as a function definition in a first worksheet of the spreadsheet application;

c. associating a moniker with the function definition;

d. invoking the function in a cell of a second worksheet by inserting the moniker associated with the function definition into the cell of the second worksheet in the spreadsheet application;

e. scanning at least one input to the sequence of calculations in the function definition;

f. scanning at least one output from the sequence of calculations in the function definition;

g. determining the inputs that each output is dependent on in order to calculate the output;

h. generating a dependency graph for the sequence of calculations in the function definition;

i. invoking a fold function in at least one cell of the second worksheet, wherein the fold function comprises the moniker associated with the function definition;

j. accepting the function from the function definition;

k. accepting an initial value;

l. accepting a plurality of sets of inputs for the function;

m. setting a current set of inputs equal to a first set of inputs;

n. generating a value for the function based on the initial value and the current set of inputs;

o. resetting the initial value equal to the value generated for the function;

p. determining if there is another set of inputs for the function;

q. repeating steps (m)-(n) for each additional set of inputs for the function based on a positive determination that there is another set of inputs; and r. displaying the value in the second worksheet.

10. A computer-implemented method for invoking a sequence of calculations in a spreadsheet application comprising:

a. accepting the sequence of calculations as a function in the spreadsheet application;

b. storing the function as a function definition in a first worksheet of the spreadsheet application;

c. associating a moniker with the function definition;

d. invoking the function in a cell of a second worksheet by inserting the moniker associated with the function definition into the cell of the second worksheet in the spreadsheet application;

e. scanning at least one input to the sequence of calculations in the function definition;

f. scanning at least one output from the sequence of calculations in the function definition;

g. determining the inputs that each output is dependent on in order to calculate the output;

h. generating a dependency graph for the sequence of calculations in the function definition;

19 i. invoking a bind function in at least one cell of the second worksheet, wherein the bind function comprises the moniker associated with the function definition;
j. accepting the function from the function definition;
k. accepting a first set of inputs for the function;
l. accepting an index for each input in the first set of inputs being bound;
m. generating an updated function comprising the bound inputs; and
n. returning the updated function to the second worksheet.

11. A computer-implemented method for invoking a sequence of calculations in a spreadsheet application comprising:
   a. accepting the sequence of calculations as a function in the spreadsheet application;
   b. storing the function as a function definition in a first worksheet of the spreadsheet application;
   c. associating a moniker with the function definition;
   d. invoking the function in a cell of a second worksheet by inserting the moniker associated with the function definition into the cell of the second worksheet in the spreadsheet application;
   e. scanning at least one input to the sequence of calculations in the function definition;
   f. scanning at least one output from the sequence of calculations in the function definition;
   g. determining the inputs that each output is dependent on in order to calculate the output;
   h. generating a dependency graph for the sequence of calculations in the function definition;
   i. invoking a filter function in at least one cell of the second worksheet, wherein the filter function comprises the moniker associated with the function definition;
   j. accepting a filter predicate, wherein the filter predicate defines at least one input to be included in a set of inputs for the set of inputs to be applied to the function;
   k. accepting the function from the function definition;
   l. accepting a first set of inputs for the function;
   m. determining if the first set of inputs comprises the filter predicate;
   n. generating a value for the function based on the first set of inputs based on a positive determination that the first set of inputs comprises the filter predicate;
   o. adding the value to an array of results;
   p. determining if there is another set of inputs for the function;
   q. accepting a next set of inputs based on a positive determination that there is another set of inputs;
   r. repeating steps (m)-(o) for the next set of inputs; and
   s. displaying the array of results in the second worksheet.

12. A computer-implemented method for invoking a sequence of calculations in a spreadsheet application comprising:
   a. accepting the sequence of calculations as a function in the spreadsheet application;
   b. storing the function as a function definition in a first worksheet of the spreadsheet application;
   c. associating a moniker with the function definition;
   d. invoking the function in a cell of a second worksheet by inserting the moniker associated with the function definition into the cell of the second worksheet in the spreadsheet application;
   e. scanning at least one input to the sequence of calculations in the function definition;
   f. scanning at least one output from the sequence of calculations in the function definition;

20 g. determining the inputs that each output is dependent on in order to calculate the output;
   h. generating a dependency graph for the sequence of calculations in the function definition;
   i. invoking an iterate function in at least one cell of the second worksheet, wherein the iterate function comprises the moniker associated with the function definition;
   j. accepting the function from the function definition;
   k. accepting an initial value for the function;
   l. accepting an iteration count and an iteration value;
   m. generating a value for the function based on the initial value;
   n. determining if the iteration count is less than the iteration value;
   o. resetting the initial value equal to the value for the function based on a positive determination that the iteration count is less than the iteration value;
   p. repeating steps (m)-(o); and
   q. displaying the value in the second worksheet based on a negative determination that the iteration count is less than the iteration value.

13. A computer-implemented method for invoking a sequence of calculations in a spreadsheet application comprising:
   a. accepting the sequence of calculations as a function in the spreadsheet application;
   b. storing the function as a function definition in a first worksheet of the spreadsheet application;
   c. associating a moniker with the function definition;
   d. invoking the function in a cell of a second worksheet by inserting the moniker associated with the function definition into the cell of the second worksheet in the spreadsheet application;
   e. scanning at least one input to the sequence of calculations in the function definition;
   f. scanning at least one output from the sequence of calculations in the function definition;
   g. determining the inputs that each output is dependent on in order to calculate the output;
   h. generating a dependency graph for the sequence of calculations in the function definition;
   i. invoking a scan function in at least one cell of the second worksheet, wherein the scan function comprises the moniker associated with the function definition;
   j. accepting the function from the function definition;
   k. accepting an initial value;
   l. accepting a plurality of sets of inputs for the function;
   m. generating a value for the function based on the initial value and a first set of inputs from the plurality of sets of inputs;
   n. appending the value to an array of results;
   o. resetting the initial value equal to the value;
   p. determining if there is another set of inputs for the function;
   q. repeating steps (m)-(o) for each additional set of inputs for the function; and
   r. displaying the array of results in the second worksheet.

14. A computer-implemented method for invoking a sequence of calculations in a spreadsheet application comprising:
   a. accepting a selection of the sequence of calculations in the spreadsheet application;
   b. generating a function definition template;
   c. receiving a moniker to be associated with a function definition;

d. receiving an input to the sequence of calculations in the function definition template;
e. receiving a location for displaying an output to the sequence of calculations in the function definition template;
f. generating a function definition comprising a function;
g. invoking the function in the spreadsheet application by calling the moniker associated with the function definition in the spreadsheet application;
h. scanning at least one input to the sequence of calculations in the function definition;
i. scanning at least one output from the sequence of calculations in the function definition;
j. determining the inputs that each output is dependent on in order to calculate the output;
k. generating a dependency graph for the sequence of calculations in the function definition;
l. accepting a moniker associated with the function definition;
m. receiving at least one set of inputs to the series of calculations in the function defined by the function definition;
n. determining a first output node from the dependency graph for the sequence of calculations in the function definition;
o. accepting at least one input value for the first output node;
p. calculating the first output node; and
q. repeating steps (n)-(p) for each additional output node in the dependency graph.

15. The computer-implemented method of claim 14, wherein the selection of the sequence of calculations is made from at least one cell in a spreadsheet.

16. The computer-implemented method of claim 14, wherein the moniker is selected from a plurality of monikers in a function name table.

17. The computer-implemented method of claim 14, wherein the moniker is received as a user input in a dialog box in the spreadsheet application.

18. A computer-implemented method for invoking a sequence of calculations in a spreadsheet application comprising:
   a. accepting the sequence of calculations as a function in the spreadsheet application;
   b. storing the function as a function definition in a first worksheet of the spreadsheet application;
   c. associating a moniker with the function definition;
   d. invoking a map function in at least one cell of a second worksheet, wherein the map function comprises the moniker associated with the function definition;
   e. accepting the function from the function definition;
   f. accepting a plurality of sets of inputs for the function;
   g. generating a value for the function based on a first set of inputs;
   h. appending the value to an array of results;
   i. determining if there is another set of inputs for the function;
   j. repeating steps (g)-(i) for each additional set of inputs for the function based on a positive determination that there is an another set of inputs; and
   k. displaying the array of results in the second worksheet.

19. A computer-implemented method for invoking a sequence of calculations in a spreadsheet application comprising:
   a. accepting the sequence of calculations as a function in the spreadsheet application;
   b. storing the function as a function definition in a first worksheet of the spreadsheet application;
   c. associating a moniker with the function definition;
   d. invoking a fold function in at least one cell of a second worksheet, wherein the fold function comprises the moniker associated with the function definition;
   e. accepting the function from the function definition;
   f. accepting an initial value;
   g. accepting a plurality of sets of inputs for the function;
   h. setting a current set of inputs equal to a first set of inputs;
   i. generating a value for the function based on the initial value and the current set of inputs;
   j. resetting the initial value equal to the value generated for the function;
   k. determining if there is another set of inputs for the function;
   l. repeating steps (h)-(i) for each additional set of inputs for the function based on a positive determination that there is another set of inputs; and
   m. displaying the value in the second worksheet.

20. A computer-implemented method for invoking a sequence of calculations in a spreadsheet application comprising:
   accepting the sequence of calculations as a function in the spreadsheet application;
   storing the function as a function definition in a first worksheet of the spreadsheet application;
   associating a moniker with the function definition;
   invoking a bind function in at least one cell of a second worksheet, wherein the bind function comprises the moniker associated with the function definition;
   accepting the function from the function definition;
   accepting a first set of inputs for the function;
   accepting an index for each input in the first set of inputs being bound;
   generating an updated function comprising the bound inputs; and
   returning the updated function to the second worksheet.

21. A computer-implemented method for invoking a sequence of calculations in a spreadsheet application comprising:
   a. accepting the sequence of calculations as a function in the spreadsheet application;
   b. storing the function as a function definition in a first worksheet of the spreadsheet application;
   c. associating a moniker with the function definition;
   d. invoking a filter function in at least one cell of a second worksheet, wherein the filter function comprises the moniker associated with the function definition;
   e. accepting a filter predicate, wherein the filter predicate defines at least one input to be included in a set of inputs for the set of inputs to be applied to the function;
   f. accepting the function from the function definition;
   g. accepting a first set of inputs for the function;
   h. determining if the first set of inputs comprises the filter predicate;
   i. generating a value for the function based on the first set of inputs based on a positive determination that the first set of inputs comprises the filter predicate;
   j. adding the value to an array of results;
   k. determining if there is another set of inputs for the function;

l. accepting a next set of inputs based on a positive determination that there is another set of inputs;

m. repeating steps (h)-(j) for the next set of inputs; and n. displaying the array of results in the second worksheet.

22. A computer-implemented method for invoking a sequence of calculations in a spreadsheet application comprising:

a. accepting the sequence of calculations as a function in the spreadsheet application;

b. storing the function as a function definition in a first worksheet of the spreadsheet application;

c. associating a moniker with the function definition;

d. invoking an iterate function in at least one cell of a second worksheet, wherein the iterate function comprises the moniker associated with the function definition;

e. accepting the function from the function definition;

f. accepting an initial value for the function;

g. accepting an iteration count and an iteration value;

h. generating a value for the function based on the initial value;

i. determining if the iteration count is less than the iteration value;

j. resetting the initial value equal to the value for the function based on a positive determination that the iteration count is less than the iteration value;

k. repeating steps (h)-(j); and l. displaying the value in the second worksheet based on a negative determination that the iteration count is less than the iteration value.

23. A computer-implemented method for invoking a sequence of calculations in a spreadsheet application comprising:

a. accepting the sequence of calculations as a function in the spreadsheet application;

b. storing the function as a function definition in a first worksheet of the spreadsheet application;

c. associating a moniker with the function definition;

d. invoking a scan function in at least one cell of a second worksheet, wherein the scan function comprises the moniker associated with the function definition;

e. accepting the function from the function definition;

f. accepting an initial value;

g. accepting a plurality of sets of inputs for the function;

h. generating a value for the function based on the initial value and a first set of inputs from the plurality of sets of inputs;

i. appending the value to an array of results;

j. resetting the initial value equal to the value;

k. determining if there is another set of inputs for the function;

l. repeating steps (h)-(j) for each additional set of inputs for the function; and m. displaying the array of results in the second worksheet.

* * * * *